(12) United States Patent
Stella et al.

(10) Patent No.: US 9,461,823 B2
(45) Date of Patent: *Oct. 4, 2016

(54) SYSTEM AND METHOD FOR LIMITING EXPLOITABLE OR POTENTIALLY EXPLOITABLE SUB-COMPONENTS IN SOFTWARE COMPONENTS

(71) Applicant: LUMINAL, INC., Frederick, MD (US)

(72) Inventors: Josha Stella, Shepherdstown, WV (US); Dominic Zippilli, Martinsburg, WV (US); Matthew Brinkman, Martinsburg, WV (US)

(73) Assignee: FUGUE, INC., Frederick, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,831

(22) Filed: Apr. 6, 2015

(65) Prior Publication Data

US 2015/0213271 A1    Jul. 30, 2015

Related U.S. Application Data

(63) Continuation of application No. 14/467,933, filed on Aug. 25, 2014, now Pat. No. 9,003,525, which is a continuation of application No. 13/969,158, filed on Aug. 16, 2013, now Pat. No. 8,819,836.

(Continued)

(51) Int. Cl.
*G06F 11/00* (2006.01)
*H04L 9/14* (2006.01)
(Continued)

(52) U.S. Cl.
CPC ........... *H04L 9/14* (2013.01); *G06F 21/57* (2013.01); *G06F 21/577* (2013.01); *H04L 63/0428* (2013.01); *G06F 2221/033* (2013.01); *G06F 2221/034* (2013.01); *H04L 2209/24* (2013.01)

(58) Field of Classification Search
CPC .................................................. H04L 63/1416
USPC ............................................. 726/22, 23, 25
See application file for complete search history.

(56) References Cited

U.S. PATENT DOCUMENTS 5,680,547 A * 10/1997 Chang ........................... 709/222
6,199,203 B1    3/2001 Saboff ............................ 717/11

(Continued)

OTHER PUBLICATIONS

U.S. Appl. No. 13/969,216—U.S. Non-Final Office Action, dated Nov. 27, 2013, 21 pages.

(Continued)

*Primary Examiner* — Christopher Brwon
(74) *Attorney, Agent, or Firm* — Morrison & Foerster LLP

(57) ABSTRACT

Approaches for limiting exploitable or potentially exploitable sub-components in software components are disclosed. In certain implementations, a first software component in the component creation environment may be identified. The first software component may include a first sub-component that provides a function that is exploitable or potentially exploitable to compromise the first software component. The first sub-component may be disabled such that the function provided by the first sub-component is not available via the first software component when the first software component is executed. The first software component may be placed in the component repository after the first sub-component is disabled such that the first software component is placed in the component repository without availability of the function provided by the first sub-component. In some implementations, disabling the first sub-component may comprise removing the first sub-component from the first software component.

18 Claims, 14 Drawing Sheets

Related U.S. Application Data

(60) Provisional application No. 61/684,743, filed on Aug. 18, 2012, provisional application No. 61/684,744, filed on Aug. 18, 2012, provisional application No. 61/684,745, filed on Aug. 18, 2012, provisional application No. 61/684,746, filed on Aug. 18, 2012.

(51) Int. Cl.
*H04L 29/06* (2006.01)
*G06F 21/57* (2013.01)

(56) References Cited

U.S. PATENT DOCUMENTS

| | | | |
|---|---|---|---|
| 6,272,499 B1 | 8/2001 | Wooten | 707/102 |
| 6,501,995 B1 | 12/2002 | Kinney et al. | 700/1 |
| 7,188,163 B2 | 3/2007 | Srinivasan et al. | 709/221 |
| 7,275,213 B2 | 9/2007 | Katano | 715/744 |
| 7,284,274 B1 | 10/2007 | Walls et al. | 726/25 |
| 7,350,207 B2 | 3/2008 | Fisher | 717/178 |
| 7,486,678 B1 | 2/2009 | Devanagondi et al. | 370/394 |
| 7,533,377 B2 | 5/2009 | Appavoo et al. | 717/168 |
| 7,735,078 B1 | 6/2010 | Vaidya | 717/171 |
| 8,218,539 B2 | 7/2012 | Dai | 370/389 |
| 8,745,746 B1* | 6/2014 | Jain | 726/25 |
| 8,755,522 B2 | 6/2014 | Stella et al. | 380/201 |
| 2002/0178375 A1* | 11/2002 | Whittaker et al. | 713/200 |
| 2002/0188935 A1 | 12/2002 | Hertling et al. | 717/170 |
| 2003/0147369 A1 | 8/2003 | Singh et al. | 370/338 |
| 2003/0156718 A1 | 8/2003 | Candelore et al. | 380/211 |
| 2004/0255290 A1 | 12/2004 | Bates et al. | 717/174 |
| 2006/0165232 A1 | 7/2006 | Burazerovic et al. | 380/37 |
| 2006/0282897 A1 | 12/2006 | Sima et al. | 726/25 |
| 2007/0016961 A1* | 1/2007 | Vogler | G06F 8/62 726/30 |
| 2007/0033420 A1 | 2/2007 | Sherwani et al. | |
| 2007/0091926 A1 | 4/2007 | Apostolopoulos et al. | 370/473 |
| 2007/0136455 A1 | 6/2007 | Lee et al. | 709/223 |
| 2007/0242620 A1 | 10/2007 | Zhai | 370/252 |
| 2008/0022374 A1 | 1/2008 | Brown et al. | 726/5 |
| 2008/0092235 A1 | 4/2008 | Comlekoglu | 726/22 |
| 2008/0095149 A1 | 4/2008 | Dai | 370/389 |
| 2008/0134177 A1* | 6/2008 | Fitzgerald | G06F 21/51 718/1 |
| 2008/0229300 A1 | 9/2008 | O'Brien | 717/168 |
| 2008/0263658 A1 | 10/2008 | Michael et al. | 726/22 |
| 2009/0076628 A1 | 3/2009 | Smith et al. | 700/3 |
| 2009/0125897 A1 | 5/2009 | Matlin et al. | |
| 2009/0254900 A1 | 10/2009 | Nakamura | 717/176 |
| 2009/0319773 A1 | 12/2009 | Frenkel et al. | 713/153 |
| 2010/0083240 A1 | 4/2010 | Siman | 717/144 |
| 2010/0195663 A1 | 8/2010 | Sharma et al. | 370/419 |
| 2010/0262950 A1 | 10/2010 | Garland | 717/113 |
| 2010/0325622 A1 | 12/2010 | Morton | 717/168 |
| 2011/0064081 A1 | 3/2011 | Lee et al. | 370/392 |
| 2011/0154313 A1 | 6/2011 | Nolterieke et al. | 717/170 |
| 2011/0209131 A1 | 8/2011 | Hohenstein et al. | 717/168 |
| 2011/0258701 A1 | 10/2011 | Cruz et al. | 726/23 |
| 2011/0296391 A1 | 12/2011 | Gass et al. | 717/168 |
| 2011/0321028 A1 | 12/2011 | Evans et al. | 717/170 |
| 2012/0066672 A1 | 3/2012 | Smith et al. | 717/170 |
| 2012/0079472 A1 | 3/2012 | Lenger | 717/170 |
| 2012/0166582 A1 | 6/2012 | Binder | 709/217 |
| 2012/0192253 A1 | 7/2012 | Betsch et al. | 726/4 |
| 2012/0243533 A1 | 9/2012 | Leong | 370/389 |
| 2012/0317416 A1 | 12/2012 | Shetty et al. | 713/168 |
| 2013/0081007 A1 | 3/2013 | Charters et al. | 717/168 |
| 2014/0033308 A1* | 1/2014 | Sawyer et al. | 726/23 |
| 2014/0047546 A1 | 2/2014 | Sidagni | 726/25 |
| 2014/0052979 A1 | 2/2014 | Stella et al. | 713/150 |
| 2014/0053273 A1 | 2/2014 | Stella et al. | 726/25 |
| 2014/0053274 A1 | 2/2014 | Stella et al. | 726/25 |
| 2014/0241380 A1 | 8/2014 | Bennett et al. | 370/474 |
| 2014/0380043 A1 | 12/2014 | Stella et al. | 713/160 |
| 2014/0380487 A1 | 12/2014 | Stella et al. | 726/25 |

OTHER PUBLICATIONS

U.S. Appl. No. 13/969,158—U.S. Non-Final Office Action, dated Dec. 6, 2013, 15 pages.
U.S. Appl. No. 13/969,181—U.S. Non-Final Office Action, dated Jan. 2, 2014, 17 pages.
U.S. Appl. No. 13/969,216—U.S. Notice of Allowance, dated Mar. 18, 2014, 17 pages.
International Patent Application No. PCT/US2013/055449—International Search Report and Written Opinion, dated Apr. 28, 2014, 25 pages.
U.S. Appl. No. 13/969,181—U.S. Final Office Action, dated May 9, 2014, 19 pages.
U.S. Appl. No. 13/969,216—U.S. Notice of Allowance, dated May 21, 2014, 9 pages.
U.S. Appl. No. 13/969,158—U.S. Notice of Allowance, dated May 23, 2014, 20 pages.
Parelkar et al., "Authenticated Encryption in Hardware", A Thesis Submitted to the Graduate Faculty of George Mason University, 2005, pp. 1-128 (143 pages).
Tanenbaum et al., "Network Protocols", *Computing Surveys*, vol. 13, No. 4, Dec. 1981, pp. 453-489 (37 pages).
U.S. Appl. No. 14/467,933—U.S. Non-Final Office Action, dated Nov. 3, 2014, 17 pages.
U.S. Appl. No. 13/969,181—U.S. Notice of Allowance, dated Feb. 3, 2015, 11 pages.
U.S. Appl. No. 14/305,500—U.S. Notice of Allowance, dated Feb. 23, 2015, 9 pages.
Stella, J., U.S. Office Action mailed Jul. 9, 2015, directed to U.S. Appl. No. 14/691,436; 20 pages.
Stella et al., U.S. Office Action dated Sep. 15, 2015, directed to U.S. Appl. No. 14/679,811; 14 pages.
Stella et al., U.S. Office Action mailed Mar. 2, 2016, directed to U.S. Appl. No. 14/691,436; 21 pages.
Microsoft "Windows Update Explained: How the Software Update Service Works and Why it Matters to You," Published Sep. 2008; 12 pages.
Partial Supplementary European Search Report mailed Mar. 3, 2016, directed to European Application No. 13831764.9; 9 pages.

* cited by examiner

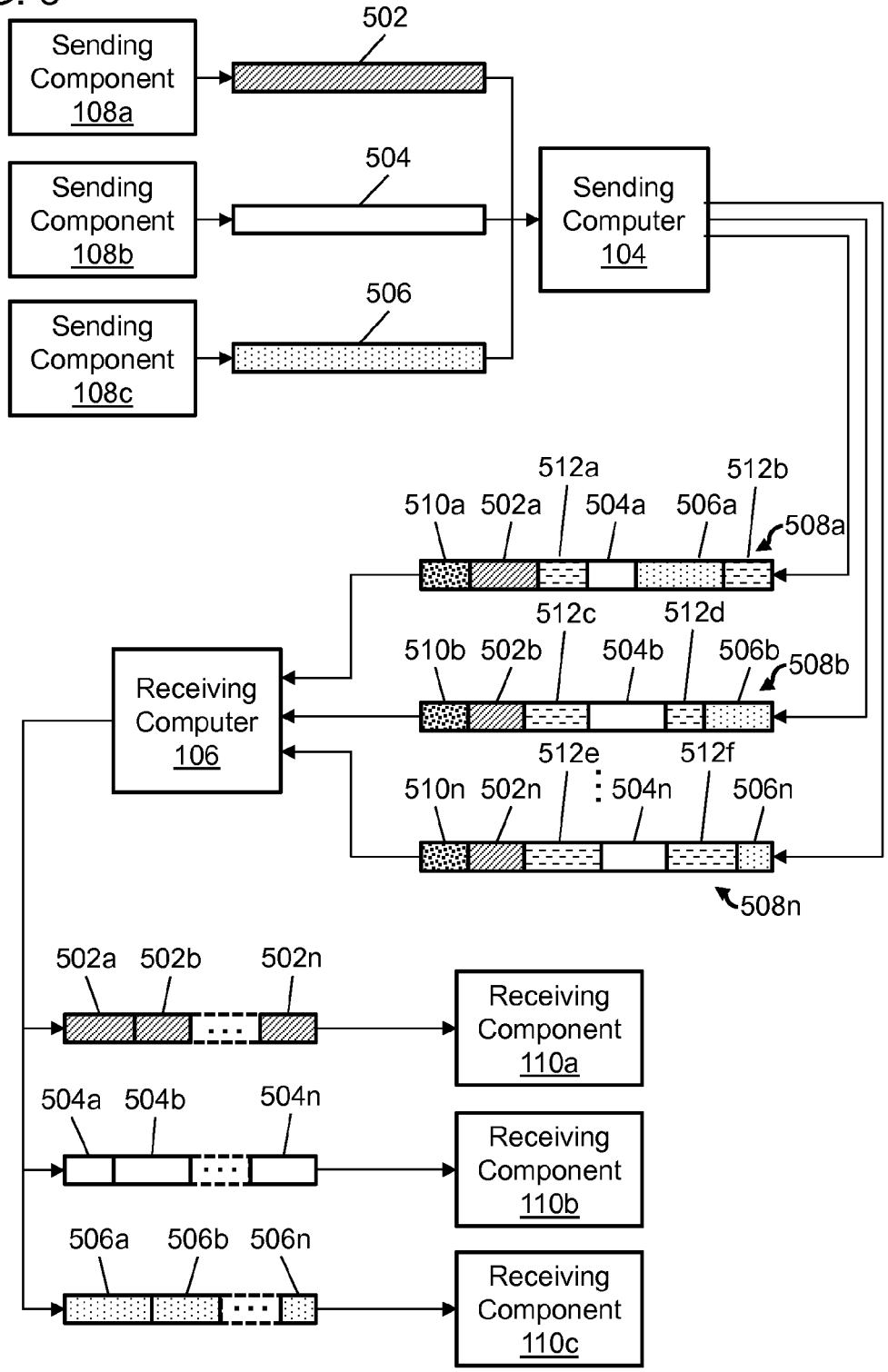

SYSTEM AND METHOD FOR LIMITING EXPLOITABLE OR POTENTIALLY EXPLOITABLE SUB-COMPONENTS IN SOFTWARE COMPONENTS

CROSS-REFERENCE TO RELATED APPLICATIONS

This application is a continuation of U.S. patent application Ser. No. 14/467,933, filed Aug. 25, 2014, which is a continuation of U.S. patent application Ser. No. 13/969,158, filed Aug. 16, 2013 (issued as U.S. Pat. No. 8,819,836 on Aug. 26, 2014), which claims priority to: (1) U.S. Provisional Patent Application Ser. No. 61/684,743, filed Aug. 18, 2012; (2) U.S. Provisional Patent Application Ser. No. 61/684,744, filed Aug. 18, 2012; (3) U.S. Provisional Patent Application Ser. No. 61/684,745, filed Aug. 18, 2012; and (4) U.S. Provisional Patent Application Ser. No. 61/684,746, filed Aug. 18, 2012, each of which is hereby incorporated by reference herein in its entirety.

This application is additionally related to the following, U.S. utility patent applications, filed on Aug. 16, 2013: (1) U.S. patent application Ser. No. 13/969,181 entitled, "SYSTEM AND METHOD FOR REPLACING SOFTWARE COMPONENTS WITH CORRESPONDING KNOWN-GOOD SOFTWARE COMPONENTS WITHOUT REGARD TO WHETHER THE SOFTWARE COMPONENTS HAVE BEEN COMPROMISED OR POTENTIALLY COMPROMISED;" and (2) U.S. patent application Ser. No. 13/969,216 entitled, "SYSTEM AND METHOD FOR INTERLEAVING INFORMATION INTO SLICES OF A DATA PACKET, DIFFERENTIALLY ENCRYPTING THE SLICES, AND OBFUSCATING INFORMATION IN THE DATA PACKET," and PCT Application PCT/US2013/055449 entitled "SYSTEM AND METHOD FOR PROVIDING A SECURE COMPUTATIONAL ENVIRONMENT," each of which is additionally hereby incorporated by reference herein in its entirety.

FIELD OF THE INVENTION

The invention relates to securing and maintaining integrity of components and/or information by limiting exploitable or potentially exploitable sub-components in software components.

BACKGROUND OF THE INVENTION

As the world becomes more technologically advanced and dependent on computer systems, cyber attacks are increasing in sophistication and intensity. These attacks include the use of exploits to steal proprietary information, spread malware, disrupt services, or cause other problems. Traditional defense solutions, such as firewalls, anti-malware detection systems, etc., focus on identifying and mitigating these threats. However, traditional defense solutions ignore many of the underlying issues that allow exploits or other threats to exist. For example, components are generally exposed in the runtime environment for long periods of times, and provide administrative access and privileges that may not be necessary for operations. In addition, networks are typically exposed via the connections required to maintain components in the runtime environment. Furthermore, in many instances, discovering compromised components can be difficult and when/if finally discovered, extensive damage or negative effects may have already been inflicted.

SUMMARY OF THE INVENTION

The disclosure addressing these and other drawbacks relates to methods, apparatuses, and/or systems for securing and maintaining integrity of component and/or information. Among other approaches, a system may facilitate security and integrity of components and/or information by limiting exploitable or potentially exploitable sub-components in components (e.g., software components or other components).

By way of example, software components may comprise virtual machines, applications, operating system processes, executable blocks of code (e.g., functions or other executable code blocks), or other components. As discussed, software components typically provide administrative access or privileges that may not be necessary for operations. Such access or privileges may, for example, be exploited by malware or other threats to compromise the software components providing the administrative access/privilege or other software components. While traditional defense solutions generally focus on discovering software components that have become compromised and mitigating the negative effects relating to the compromised software components, the system may alternatively or additionally eliminate or otherwise reduce compromised software components and related negative effects by removing or otherwise disabling exploitable or potentially exploitable sub-components in the software components after the software components are generated and before the software components are placed in an environment in which the software component may be compromised.

In one use case, for example, exploitable or potentially exploitable sub-components in software components may be automatically removed or otherwise disabled after the software components are created in a component creation environment, but before the software components are placed in a component repository that is separate from the component creation environment.

It should be noted that, while various implementations are described with respect to limiting exploitable or potentially exploitable sub-components in software components, it is contemplated that in some implementations exploitable or potentially exploitable sub-components in components of other component types may additionally or alternatively be limited.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

The invention is illustrated by way of example, and not by way of limitation, in the figures of the accompanying drawing and in which like reference numerals refer to similar elements.

FIG. 5 is an exemplary illustration of information transmission between two computer systems, according to an aspect of the invention.

DETAILED DESCRIPTION OF THE INVENTION

In the following description, for the purposes of explanation, numerous specific details are set forth in order to provide a thorough understanding of the implementations of the invention. It will be appreciated, however, by one skilled in the art that the implementations of the invention may be practiced without these specific details or with an equivalent arrangement. In other instances, well-known structures and devices are shown in block diagram form in order to avoid unnecessarily obscuring the implementations of the invention.

Figure 1:
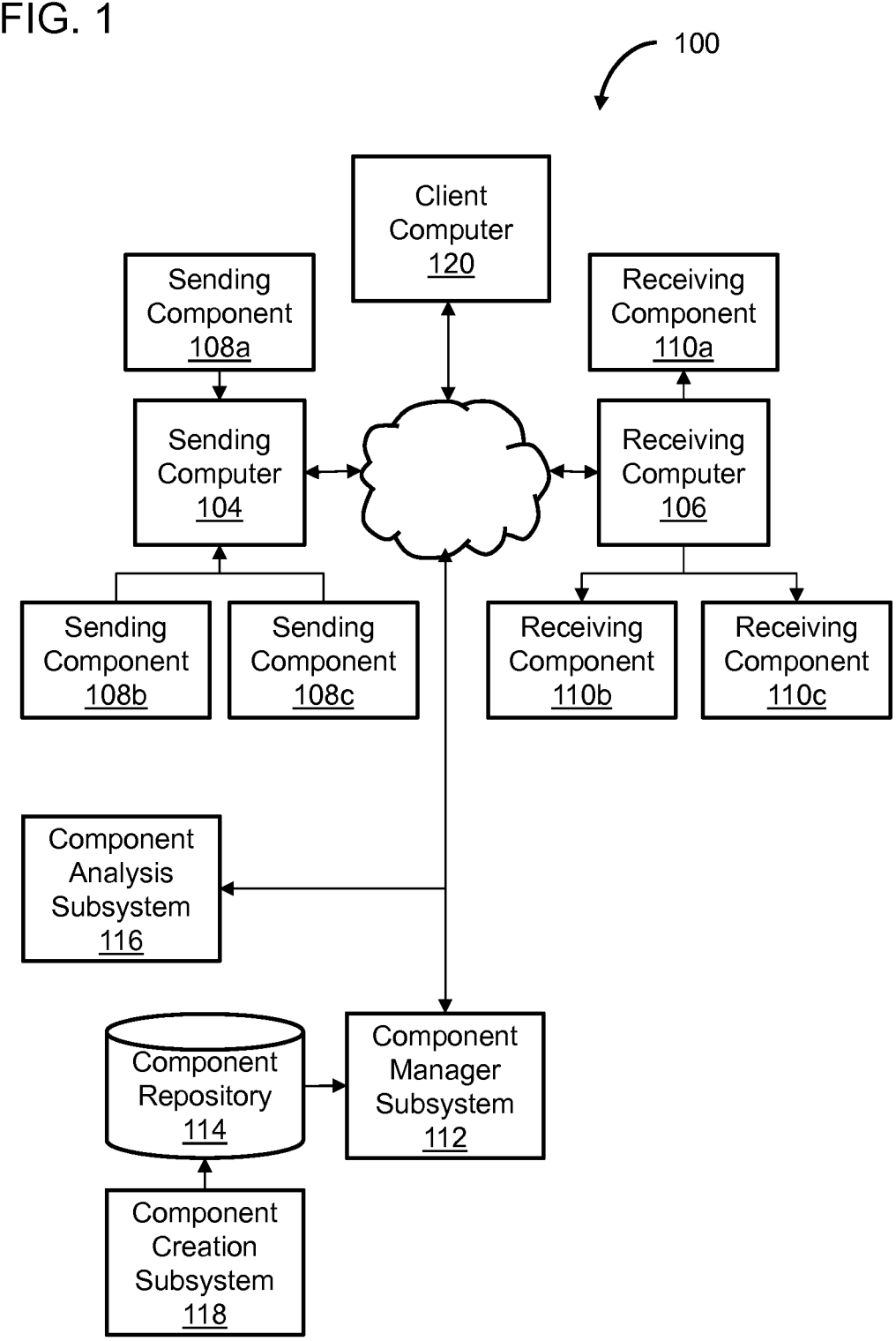
FIG. 1 is an exemplary illustration of a system for facilitating security and integrity of components and information, according to an aspect of the invention.

FIG. 1 is an exemplary illustration of a system 100 for facilitating the security and integrity of components and information, according to an aspect of the invention. System 100 may include one or more computers and sub-systems that provide different protective measures to facilitate the security and integrity of components that may be exposed to a networked or otherwise accessible environment and/or facilitate the security of information transmitted over a network from or to system components. The different protective measures may be used individually or in combination with other protective measures. The protective measures may include, for example, disabling certain interfaces or other sub-components of software components, replacing software components with corresponding known-good software components irrespective of whether the software components have been compromised, interleaving and obfuscating information that is transmitted over a network, and/or other protective measures.

In some implementations, system 100 may disable interfaces or other sub-components of a given component that may be vulnerable to being compromised. For example, system 100 may include a component creation subsystem 118 that creates components that when instantiated operate at a runtime environment and are accessible over a network. A given component may include a sub-component such as, for example, a component interface that conventionally is used by system administrators to perform maintenance or administrative operations on the given component but is oftentimes exploited by attackers and others to compromise the given component. In some implementations, component creation subsystem 118 may be programmed to disable the sub-component so that the sub-component is no longer accessible and therefore can no longer be exploited by the attackers or others. As such, components created by component creation subsystem 118 when instantiated may have certain sub-components that are disabled and therefore are no longer vulnerable to attack. The disabling of the exploitable or potentially exploitable sub-components may, for example, prevent configurations (e.g., pre-configurations that establish a unique relationship with another component or other configurations) from being modified in a way that may negatively affect the security or integrity of the software component and information that the software component transmits, receives, or stores.

Component creation subsystem 118 may be programmed to disable the sub-component by removing, from the component, program code or instructions that provide the maintenance or administrative functions, configuring the component such that the sub-component is no longer accessible, and/or otherwise rendering the sub-component inaccessible (including inaccessible by the system administrators and others). As such, the system may protect components at the component level in order to enhance security of the system by removing certain sub-components that can be exploited.

In some implementations, component creation subsystem 118 may store the created components, whether or not one or more of its sub-components have been disabled, into component repository 114. In these implementations, system 100 may include a component manager subsystem 112 that is programmed to obtain from component repository 114 a given component and make accessible in the runtime environment the given component.

In some implementations, system 100 may replace components operating at the runtime environment with corresponding known-good components. For example, component manager subsystem 112 may be programmed to replace components operating at the runtime environment with corresponding known-good components irrespective of whether the components have been compromised. The corresponding known-good components may be created by component creation subsystem 118. In some implementations, one or more sub-components of the corresponding known-good components have been disabled as described herein. In these implementations, the system may provide protective measures that combine limited interfaces of components and components being replaced with corresponding known-good components. In other implementations, none of the one or more sub-components of the corresponding known-good components have been disabled.

In some implementations, system 100 may perform analysis on components that have been replaced. In these implementations, system 100 may include a component analysis subsystem 116 that is programmed to perform the post-replacement analysis. The system may use such post-replacement analysis to determine whether, to what extent, and/or how a replaced component was compromised. Because the analysis occurs post-replacement, the results of the analysis are not used to determine whether the component being analyzed should be replaced.

In some implementations, system 100 may securely transmit information over a network to and/or from system components. Such information can include, for example, documents, messages, text, images, data and/or other types of information that can be transmitted over a network. For example, one or more sending components 108 (illustrated in FIG. 1 as sending component 108a, 108b, 108c) may wish to individually transmit associated information to a corresponding receiving component 110 (illustrated in FIG. 1 as receiving component 110a, 110b, 110c). A given sending component 108 or a given receiving component 110 may each include an application, a computing device, and/or other component that can generate or receive information provided over a network.

In some implementations, system 100 may include a sending computer 104 that is programmed to combine different information to be transmitted into different slices of a data packet and encrypt the slices using different cryptographic schemes for secure transmission of the information. By way of example, sending computer 104 may generate data packets where each data packet includes a portion of information associated with sending component 108a, a portion of information associated with sending component 108b, and a portion of information associated with sending component 108c. Other numbers of sending components 108 and associated information may be used as well. Each portion of information may be represented in a data packet as encrypted data slices where each data slice in the data packet represents a portion of information associated with a sending component 108 that is different than another sending component 108 to which another data-slice-represented portion of information is associated, and/or where each data slice in the data packet may be encrypted with a cryptographic scheme that is different than another cryptographic scheme used to encrypt another data slice in the data packet. Different cryptographic schemes may, for example, include use of different encryption types and/or different encryption keys. Examples of encryption types may include one-time pad (OTP), Data Encryption Standard (DES), Advanced Encryption Standard (AES), and/or other encryption types. As used herein, a data packet may refer to a unit of communication. A data packet may, for example, refer to a datagram, a segment, a block, a cell, frame, or other unit of communication transmitted over a network.

In some implementations, receiving computer 106 may be programmed to process a data packet having data slices associated with different information that are encrypted using different cryptographic schemes. By way of example, sending computer 104 and receiving computer 106 may be pre-programmed to communicate with each other via data packets where each data packet include data slices that are associated with different information and that are encrypted using different cryptographic schemes. In some scenarios, the pre-configuration of sending computer 104 and receiving computer 106 may establish a unique relationship between the two computers 104 and 106. The relationship between the two computers may, for example, define: (i) policies available to the two computers; (ii) a collection of pads (e.g., OTP) or other cryptographic schemes that are to be used to encrypt headers, data slices, or other data packet elements; (iii) status of the relationship (e.g., where the header in the next data packet should be located, which pad should be currently be used, or other status information); or (iv) other characteristics of the relationship. While sending computer 104 may have other relationships with other computers, the other computers may not process data packets that are directed from sending computer 104 to receiving computer 106 as a result of the other relationships defining different policies, cryptographic schemes, relationship statuses, or other relationship characteristics. On the other hand, receiving computer 106 may process the data packets from sending computer 104 to obtain portions of information that are associated with different sending components 108 and combine the obtained portions to form the information that is thereafter provided to the appropriate receiving components 110.

It should be noted that a given sending component 108, a given receiving component 110, sending computer 104, and receiving computer 106 may or may not each include a component that has one or more disabled interfaces and/or is replaced by the system without respect to whether the component has been compromised as described herein. As such, the system may secure and/or obfuscate information to be transmitted over a network as described herein either alone or in combination with one or more other protective measures also described herein.

In some implementations, component manager subsystem 112 may be programmed to replace software components associated with sending computer 104 and/or software components associated with receiving computer 106 with corresponding known-good software components without regard to whether the software components have been compromised or potentially compromised. By way of example, upon passage of a replacement time interval, component manager subsystem 112 may replace a component (e.g., an information transmitting subsystem) in sending computer 104 that performs combining of different information to be transmitted into different slices of a data packet and encryption of the slices using different cryptographic schemes. Upon the passage of the replacement time interval, component manager subsystem 112 may also replace a component (e.g., an information receiving subsystem) in receiving computer 106 that performs processing of a data packet having data slices associated with different information that are encrypted using different cryptographic schemes.

The replacement components of the component in sending computer 104 and the component in receiving component, respectively, may be pre-programmed to communicate with one another via data packets where each data packet include data slices that are associated with different information and that are encrypted using different cryptographic schemes. The pre-configuration of the replacement components may, for example, establish the same relationship as the relationship between the replaced components, or a unique relationship that is different than the relationship between the replacement components. The replacement components and/or other known-good software components may be obtained from component repository 114 that is separate from a runtime environment in which the sending computer 104, the receiving computer 106, their respective components, or other components are executing. In some scenarios, regular replacement of the components with known-good software components having pre-configured relationships may be performed, causing the policies, the cryptographic schemes, and relationship statuses to change on a regular basis, and, thereby, providing further security and integrity of components and information.

In some implementations, component manager subsystem 112 may be programmed to move the replaced components to an analysis environment separate from the runtime environment in which the replaced components were previously executing. After the replaced components are moved to the analysis environment, component analysis subsystem 116 may be programmed to analyze the replaced components to determine whether and/or how the replaced components have been compromised. In this way, among other benefits, new versions of software components that are more resistant to compromise may be developed to replace less-resistant corresponding software components.

As shown by FIG. 1, system 100 may further comprise client computer 120 (or multiple client computers 120). Client computer 120 may comprise any type of mobile terminal, fixed terminal, or other device. By way of example, client computer 120 may comprise a desktop computer, a notebook computer, a netbook computer, a tablet computer, a smartphone, a navigation device, an electronic book device, a gaming device, or other client computer. Users may, for instance, utilize one or more client computers 120 to interact with sending computer 104, receiving computer 106, sending components 108, receiving components 110, or other components of system 100. By way of another example, client computer 120 may comprise sending computer 104, receiving computer 106, or other components of system 100.

Having described the various system components and their overall functions, attention will now be turned to a more detailed description of each protective measure. As described herein, the system may use such protective measures individually alone or in combination with one or more other protective measures.

Replacing Components with Corresponding Known-Good Components

Figure 2:
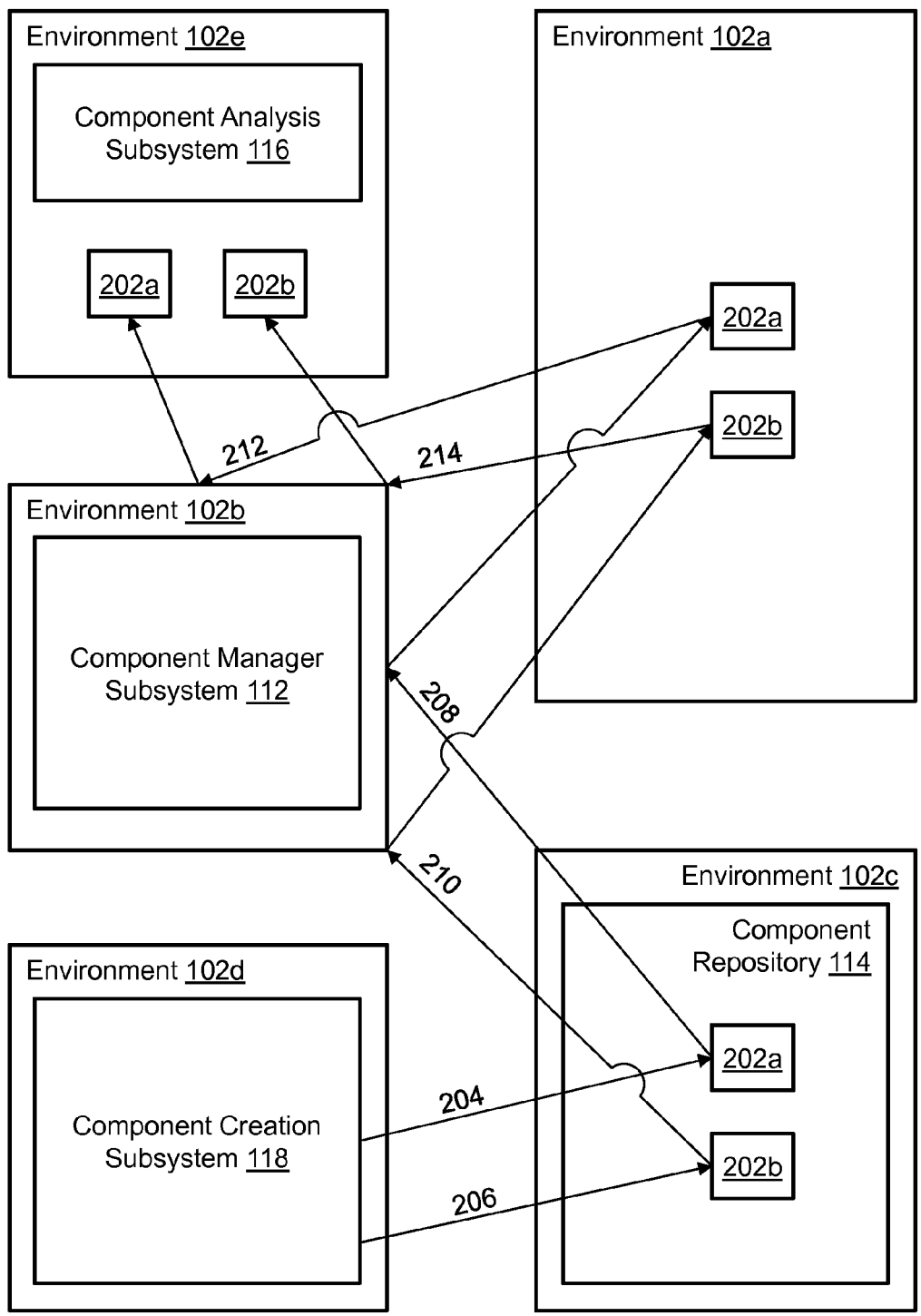
FIG. 2 is an exemplary illustration of environments in which subsystems, repositories, or other components can exist and a flowchart of operations relating to the environments, according to an aspect of the invention.

FIG. 2 is an exemplary illustration of environments 102 in which subsystems, repositories, or other components can exist and a flowchart of operations relating to environments 102, according to an aspect of the invention. As shown, environments 102 may include component manager subsystem 112, component repository 114, component analysis subsystem 116, component creation subsystem 118, or other subsystems, repositories, or components. While FIG. 2 depicts separate environments 102, it should be noted that one or more of component manager subsystem 112, component repository 114, component analysis subsystem 116, and component creation subsystem 118 may exist in the same environment or in separate environments. As described herein, it may be advantageous that subsystems or components in one environment may have limited or no access to another environment (e.g., read access restriction, write access restriction, execute access restriction, delete access restriction, and/or other access restriction).

In some implementations, security and/or integrity may be facilitated by replacing software components executing in a runtime environment with corresponding known-good software components. The replacement of the software components may be performed without regard to whether the software components executing in the runtime environment have been compromised or potentially compromised. By way of example, operations relating to the replacement of the software components (e.g., components 202a, 202b, or other components) may comprise one or more of operations 204, 206, 208, 210, 212, 214, or other operations, which are described in further detail below.

In one implementation, component manager subsystem 112 may be programmed to replace the software components with known-good software components. For example, component manager subsystem 112 may determine at least a first event indicating that at least a first software component executing in a runtime environment 102a should be replaced. Component manager subsystem 112 may replace the first software component with a second software component corresponding to the first software component based on the first event. The first software component may be replaced with the second software component such that the second software component is available for use in runtime environment 102a after the first event and the first software component is no longer available for use in runtime environment 102a after the first event. The second software component may be obtained by component manager subsystem 112 from component repository 114 that is separate from runtime environment 102a (e.g., component repository 114 may exist in environment 102c that is separate from runtime environment 102a).

As an example, the first software component and the second software component may correspond to one another by virtue of both software components being instances of the same software component, the second software component being an updated version of the first software component, or the second software component otherwise being a replacement component for the first software component. Prior to being placed and executed in runtime environment 102a, the first software component may also have been stored as a known-good software component in component repository 114.

In some implementations, with respect to FIG. 2, the first software component may be component 202a and the second software component may be component 202b. Components 202a and 202b may be corresponding instances of the same software component that are created in component creation environment 102d by component creation subsystem 118. At operations 204 and 206, the corresponding components 202a and 202b may be added to component repository 114 as replacement components. At an operation 208, component 202a may be obtained by component manager subsystem 112 to replace another corresponding component that is executing in runtime environment 102a, after which the component 202a executes in runtime environment 102 in lieu of the other corresponding component. At an operation 210, component 202b may be obtained by component manager subsystem 112 and placed in runtime environment 102a as a replacement component for component 202a that is executing in runtime environment 102a.

The first event (on which the replacement of the first software component is based) may indicate that the first software component should be replaced without respect to whether the first software component has been compromised or potentially compromised. In some implementations, the first event may include a passage of one or more replacement time intervals, a number of uses of the first software component reaching or exceeding a use threshold, availability of an updated version of the first software component, and/or other event.

In some implementations, the first software component may be replaced after the passage of the one or more replacement time intervals, and the second software component may be replaced after a second passage of the one or more replacement time intervals. As an example, software components executing in runtime environment 102a may be replaced with known-good software components on a periodic basis (e.g., every day, every hour, every minute, every second, etc.). In another use case, the first software component may be replaced after the number of uses of the first software component reaches or exceeds the use threshold. In this way, among other benefits, integrity of software components executing in runtime environment 102a may be maintained by regularly replacing the software components with corresponding known-good software components. As such, even if software components executing in runtime environment 102a become compromised, any negative effects associated with the compromised software components may be reduced via regular replacement of the software components with corresponding known-good components without regard to whether the software components have been compromised or potentially compromised.

In another use case, the first software components may be replaced after the updated version (e.g., the second software component) of the first software component becomes available. Thus, among other benefits, runtime environment 102a may reflect the most recent versions of software components available, including versions of software components that are more resistant to attack by malware or other security problems.

In various implementations, component manager subsystem 112 may be programmed to instantiate the second software component in runtime environment 102a. The second software component may, for example, be instantiated in an inactive path such that the second software component is not available for use in runtime environment 102a. The replacement of the first software component with the second software component may comprise component manager subsystem 112 placing the second software component in an active path to cause the second software component to be available for use in runtime environment 102a. The replacement of the first software component may further comprise component manager subsystem 112 moving the first software component out of the active path.

By way of example, runtime environment 102a may comprise one or more active instances of a given software component and one or more inactive instances of the software component. The inactive instances of the software component may, for example, be replacements for the active instances of the software component. As such, when a replacement of one of the active instances is to occur, the active instance may simply be replaced with one of the inactive instances. Additional corresponding known-good instances of the software component may be obtained from component repository 114 and instantiated in runtime environment 102a as inactive instances to supply runtime environment 102a with readily available replacement instances. In some implementations, the first software component may be an active instance of a particular software component, and the second software component may be an inactive instance of the software component. The second software component may be cycled into the active path to replace the first software component in the active path, and the first software component may be cycled out of the active path. As such, the second software component may be activated by cycling the second software component into the active path, while the first software component may be deactivated by cycling the first software component out of the active path.

In some implementations, component manager subsystem 112 may be programmed to move the first software component out of the active path while simultaneously or after placing the second software component in the active path. As an example, the replacement of the first software component with the second software component may be performed in a seamless manner such that no downtime is experienced by other components or users that may rely on continuous smooth operations previously provided by the first software component before the replacement.

In some implementations, the first software component may be allowed to complete the tasks that were being handled by the first software component at the time of the first event indicating that the first software component should be replaced. However, new tasks may not be assigned to the first software component to handle, but may instead be assigned to other active software components corresponding to the first software component (e.g., other active instances of the first software components) for which replacement-indicating events have not yet occurred. Upon completion of the tasks being handled by the first software component at the time of the first event, component manager subsystem may simultaneously place the second software component in the active path while moving the first software component out of the active path. New tasks may then be assigned to the second software component as well as other active software components corresponding to the second software component (e.g., other active instances of the first software component or the second software component).

In certain implementations, the first software component and the second software component may each include a virtual machine. Definitions of the software components may include one or more disk images. Runtime environment 102a may include a hypervisor on which the first software component executes before the replacement and on which the second software component executes after the replacement. The placement of the second software component in the active path may comprise component manager subsystem 112 updating a network configuration associated with the second software component such that the second software component is available for use at the runtime environment.

In some implementations, one or more external IP addresses may be associated with one or more active subnet addresses such that requests directed to the external IP addresses are redirected to software components assigned to the active subnet addresses. Software components assigned to the active subnet addresses may be available for use in runtime environment 102a, while software components assigned to inactive subnet addresses may not be available for use in runtime environment 102a. The first software component may be assigned to one of the active subnet addresses before the replacement, while the second software component may be assigned to one of the inactive subnet addresses before the replacement. In response to the first event indicating that the first software component should be replaced, the inactive subnet address assigned to the second software component may be activated, or another active subnet address may be assigned to the second software component, such that requests directed to an external IP address may be redirected to second software component via its assigned active subnet address.

In various implementations, the first software component and the second software component may each include an operating system process. The placement of the second software component in the active path may comprise component manager subsystem 112 moving the second software component into the active path via inter-process communication configuration.

In some implementations, the first software component and the second software component may each include executable code. The placement of the second software component in the active path may comprise component manager subsystem 112 updating a memory address pointer or a lookup table associated with the second software component. By way of example, a language library may utilize memory address pointers or lookup tables associated with functions (e.g., software components) available in the language library to facilitate function calls. The memory address pointers or the lookup tables may, for example, be updated after each function call to point to a different location in memory at which replacement executable code exists. In one scenario, the first software component may be executable code associated with a given function at a first memory location to which a memory address pointer or a lookup table in the language library points. The language library may be configured such that a software component (e.g., executable code associated with the function) may only be called once before the software component is replaced with a replacement software component (e.g., replacement executable code of the function). As such, after the first software component is called once, the memory address pointer or the lookup table that points to the first memory location may be updated to point to a second memory location at which replacement executable code associated with the function exists.

In certain implementations, component manager subsystem 112 may be programmed to obtain integrity information associated with the second software component. The second software component may be validated by component manager subsystem 112 based on the integrity information. The validation of the second software component may, for example, be performed before the component manager subsystem 112 utilizes the second software component to replace the first software component. In some implementations, the integrity information may be generated for the second software component while the second software component is a known-good software component. As an example, the integrity information may be generated for the second software component immediately after the second software component is ready for distribution, before the second software component is distributed outside of its creation environment, or other circumstances in which the second software component remains a known-good software component. The integrity information may, for example, be used to determine that the second software component has not been modified from its known-good form. In some scenarios, the integrity information may be generated by performing a hash operation (e.g., one-way hash or other hash operation) on the second software component.

In some implementations, component analysis subsystem 116 may be programmed to analyze the first software component after the first software component has been replaced. Component analysis subsystem 116 may be programmed to determine whether and/or how the first software component has been compromised based on the analyzing. By way of example, after the first software component has been moved out of the active path, component manager subsystem 112 may move the first software component to analysis environment 102e. As indicated, the first software component may be replaced with the second software component without regard to whether the first software component has been compromised or potentially compromised. Nevertheless, component analysis subsystem 116 may analyze the first software component to determine whether the first software component has been compromised and, if so, how the first software component has been compromised. In this way, among other benefits, new versions of software components that are more resistant to compromise may be developed to replace less-resistant corresponding software components.

In some implementations, with respect to FIG. 2, component 202a may be moved from runtime environment 102 to analysis environment 102e by component manager subsystem 112 at operation 212 after corresponding component 202b replaces component 202a in runtime environment 102a. In a further use case, component 202b may also be moved from runtime environment 102a to analysis environment 102e by component manager subsystem 112 at operation 214 after another corresponding component replaces component 202b in runtime environment 102b.

As discussed, environments 102 may include one or more separate environments 102a, 102b, 102c, 102d, 102e, or other environments. Subsystems or components in one environment may have limited access to another environment (e.g., read access restriction, write access restriction, execute access restriction, delete access restriction, or other access restriction).

By way of example, component manager subsystem 112 (e.g., located in environment 102b) may have read access to component repository 114 (e.g., located in environment 102c) to obtain the second software component from component repository 114. However, environment 102b, environment 102c, component repository 114, or component manager subsystem 112 may be configured such that component manager subsystem 112 does not have write access, execute access, or delete access to component repository 114 or environment 102c. Thus, component manager subsystem 112 may not be utilized to intentionally or accidentally compromise known-good software components stored in component repository 114.

By way of another example, component creation subsystem 118 (e.g., located in environment 102d) may have write access to component repository 114 (e.g., located in environment 102c) to add the second software component or other software component to component repository 114. However, environment 102c, environment 102d, component creation subsystem 118, or component repository 114 may be configured such that component creation subsystem 118 does not have read access, execute access, or delete access to component repository 114 or environment 102c. In some scenarios, subsystems or other components in environments 102b, 102a, 102c, or 102e may not have write access, read access, execute access, or delete access to component creation subsystem 118 or environment 102d. For example, component creation subsystem 118 may not be accessible from runtime environment 102a such that component creation subsystem 118 cannot be compromised from runtime environment 102a. In this way, component creation subsystem 118 may create software components in a compromise-free environment such that the software components are known-good software components when the created software components are placed in component repository 114.

In some implementations, security and/or integrity may be facilitated by limiting exploitable or potentially exploitable sub-components in software components that are created in a component creation environment before placing the software components in a component repository that is separate from the component creation environment. By way of example, component creation subsystem 118 may be programmed to create software components in component creation environment 102d, and limit exploitable or potentially exploitable sub-components in the software components before the software components are moved outside component creation environment 102d (e.g., before the software components are placed in component repository 114, the software components are instantiated in runtime environment 102a, etc.).

Limiting/Disabling Interfaces and Other Sub-Components

Figure 3:
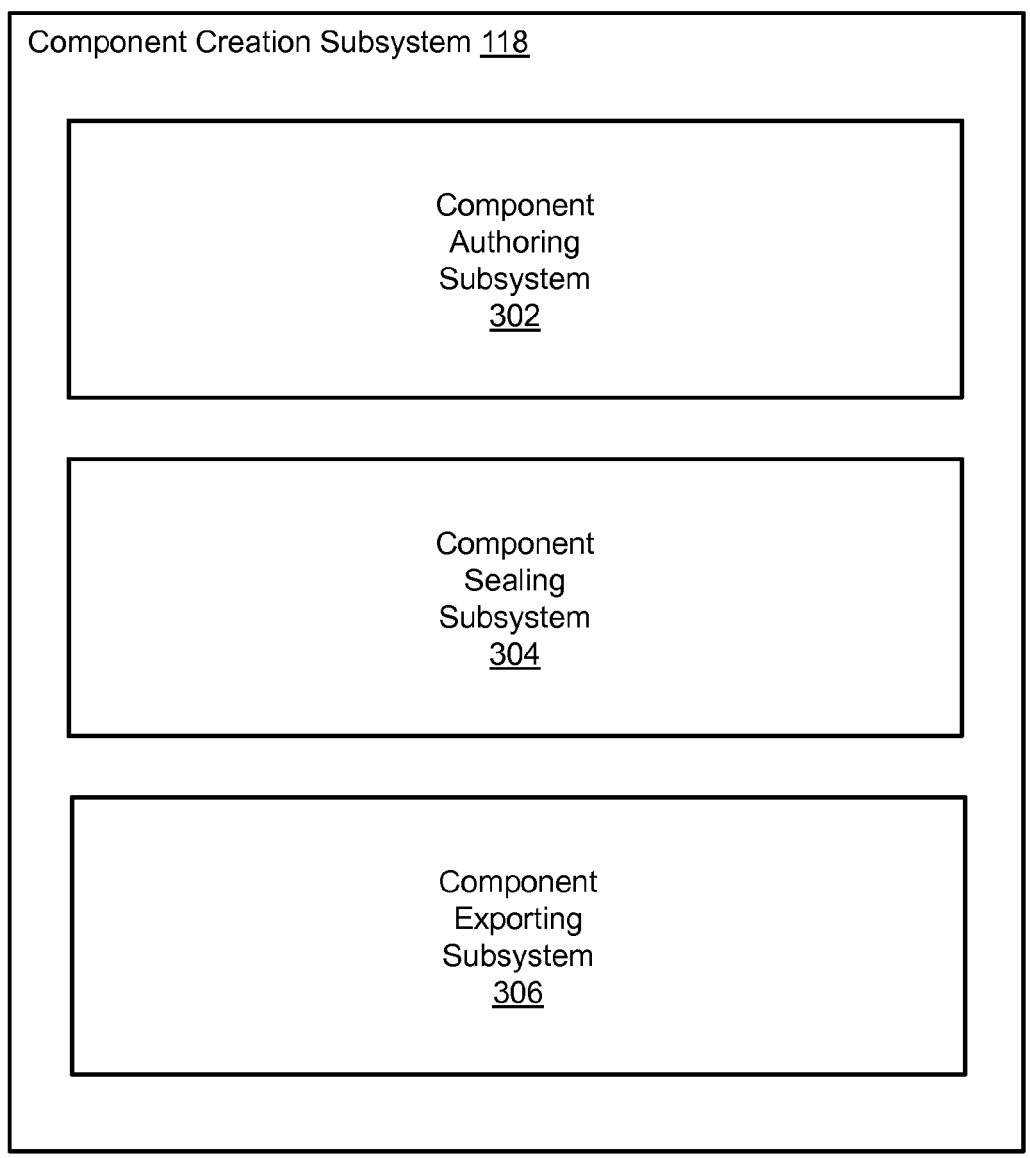
FIG. 3 is an exemplary illustration of a component creation subsystem, according to an aspect of the invention.

In one implementation, as shown by FIG. 3, component creation subsystem 118 may comprise a component authoring subsystem 302, a component sealing subsystem 304, a component exporting subsystem 306, and/or other subsystems.

In some implementations, component sealing subsystem 304 may identify at least a first software component in component creation environment 102d. The first software component may include a first sub-component that provides a function that is exploitable or potentially exploitable to compromise the first software component, a second sub-component, or other component. Component sealing subsystem 304 may identify and disable the first sub-component such that the function provided by the first sub-component will not be available via the first software component when the first software component is executed. Component exporting subsystem 306 may place the first software component in component repository 114 after the first sub-component is disabled such that the first software component is placed in component repository 114 without availability of the function provided by the first sub-component. In this way, by eliminating availability of the exploitable or potentially exploitable function from the first software component, the first software component cannot be used to access the exploitable or potentially exploitable function. Among other benefits, risks associated with the first software component becoming compromised may be reduced.

In one implementation, disabling of the first sub-component may comprise component sealing subsystem 304 removing the first sub-component from the first software component. As such, when the first software component is placed in component repository 114, the first software component may not include the first sub-component. The removal of the first sub-component from the first software component may comprise removing source code or executable code associated with the first sub-component from the first software component such that the first software component no longer includes the source code or executable code associated with the first sub-component. In some implementations, the first software component may be a virtual machine, and the first sub-component may be a secure shell (SSH) program. The removal of the first sub-component from the first software component may comprise removing executable code that make up the SSH program from the virtual machine.

In another implementation, the disabling of the first sub-component may comprise turning off the function provided by the first sub-component without removing the first sub-component from the first software component. Thus, although the first sub-component of the first software component in component repository 114 may be disabled, the first software component may still include the first sub-component. As an example, the first sub-component may be disabled for the first software component without removing the first sub-component from the first software component to avoid instability to the first software component.

In some implementations, the disabling the first sub-component may comprise associating the first software component with disabling instructions. In one implementation, the first software component may be associated with the disabling instructions such that the first sub-component will be removed from the first software component based on the disabling instructions. As an example, the first software component may be associated with a script (e.g., a Bash script or other script) that is to be run to instantiate the first software component in a runtime environment. When the first software component is instantiated, the script may remove code associated with the first sub-component from the first software component. As such, the first software component may not include the code associated with the first sub-component when the first software component is executed. As another example, the disabling instructions may be injected into the first software component before the first software component is placed in the component repository or made available for use in a runtime environment. Upon execution of the first software component, the disabling instructions may cause the code associated with the first sub-component to be removed from the first software component.

In another implementation, the first software component may be associated with the disabling instructions such that the function provided by the first sub-component will be turned off based on the disabling instructions. As an example, the first software component may be associated with a script (e.g., a Bash script or other script) that is to be run to instantiate the first software component in a runtime environment. When the first software component is instantiated, the script may cause the function provided by the first sub-component to be turned off. Thus, the function provided by the first sub-component will not be available via the first software component when the first software component is executed. As another example, the disabling instructions may be injected into the first software component before the first software component is placed in the component repository or made available for use in a runtime environment. Upon execution of the first software component, the disabling instructions may cause the function provided by the first sub-component to be turned off.

In various implementations, the function provided by the first sub-component may include a maintenance function or an administrative function used to maintain the first software component. The first sub-component may be identified or disabled based on the maintenance function or the administrative function provided by the first sub-component. By way of example, sub-components of a virtual machine that include a maintenance function or an administrative function to maintain the virtual machine may comprise telnet interfaces, SSH interfaces, remote desktop protocol (RDP) interfaces, administrative application programmable interfaces (APIs), administrative websites, or other sub-components.

In some implementations, the first software component may further include a second sub-component that is exploitable or potentially exploitable. While the first sub-component of the first software component may be disabled, the second sub-component may not be disabled. For example, the first sub-component may be disabled by component sealing subsystem 304 based on a determination that the first sub-component is not necessary for functioning of the first software component. The second sub-component may not be disabled by component sealing subsystem 304 based on a determination that the second sub-component is necessary for the functioning of the first software component.

In certain implementations, although the second sub-component may not be removed from the first software component or otherwise disabled, component sealing subsystem 304 may be programmed to remove one or more code sets associated with the second sub-component from the second sub-component to eliminate or otherwise reduce risks relating to the second sub-component. By way of example, component sealing subsystem may be programmed to identify a code set associated with the second sub-component that causes the second sub-component to be exploitable or potentially exploitable, and remove the code set from the second sub-component such that the second sub-component no longer includes the code set. When the first software component is placed in the second environment, the first software component may include the second sub-component without the code set.

In one scenario, a software component may be a virtual machine. A sub-component of the virtual machine may be Bash. Bash may not be removed from the virtual machine or otherwise disabled as a result of Bash being a shell that is required for an operating system of the virtual machine to operate appropriately. Nevertheless, a number of commands, such as "ls," "sed," "vi," etc., may be removed or otherwise disabled as a result of those commands not being required for the operating system of the virtual machine to operate appropriately. For example, code sets associated with those non-required commands may be removed from Bash such that the virtual machine may include Bash without those code sets.

In some implementations, component authoring subsystem 302 may be programmed to generate the first software component in component creation environment 102d. The first software component that is generated by component authoring subsystem 302 may include the first sub-component (that provides a function that is exploitable or potentially exploitable to compromise the first software component), a second sub-component, or other sub-component.

In one implementation, component authoring subsystem 302 may associate first profile information with the first software component. By way of example, the first profile information is used to determine whether a given sub-component of a given software component should be disabled. The first sub-component may be identified or disabled based on the first profile information. As an example, the first profile information may include information specifying sub-components that are to be disabled through removal, information specifying sub-components that are to be disabled without being removed, information specifying sub-components that are not to be disabled, or other information. In one scenario, the first profile information may be generally applicable for limiting exploitable or potentially exploitable sub-components in software components. In another scenario, the first profile information may be for limiting exploitable or potentially exploitable sub-components in one or more specific types of software components, software components associated with specific identifiers, etc. For example, the first profile information may be specific to software components having a software component type of the first software component, or specific to software components having identifiers corresponding to an identifier of the first software component.

In various implementations, component authoring subsystem 302 may be programmed to generate the first software component in component creation environment 102d such that the first software component includes the first sub-component and a second sub-component. The first component may be disabled by component sealing subsystem 304 based on the first profile information. The second component may not be disabled by component sealing subsystem 304 based on the first profile information.

In some implementations, component exporting subsystem 306 may be programmed to generate integrity information for the first software component. By way of example, the integrity information may be generated for the first software component while the first software component is a known-good software component. As an example, the integrity information may be generated for the second software component immediately after the first software component is distribution ready, before the first software component is distributed outside of its creation environment (e.g., environment 102d), or other circumstances in which the first software component remains a known-good software component.

In some implementations, the integrity information may be generated for the first software component after the first sub-component is disabled and before the first software component is placed in component repository 114. The integrity information may be used to determine whether the first software component has been modified after the integrity information is generated for the first software component. In some implementations, the integrity information may be generated by performing a hash operation (e.g., one-way hash or other hash operation) on the first software component.

Interleaving and Obfuscating Information to be Transmitted Over a Network

Figure 4A:
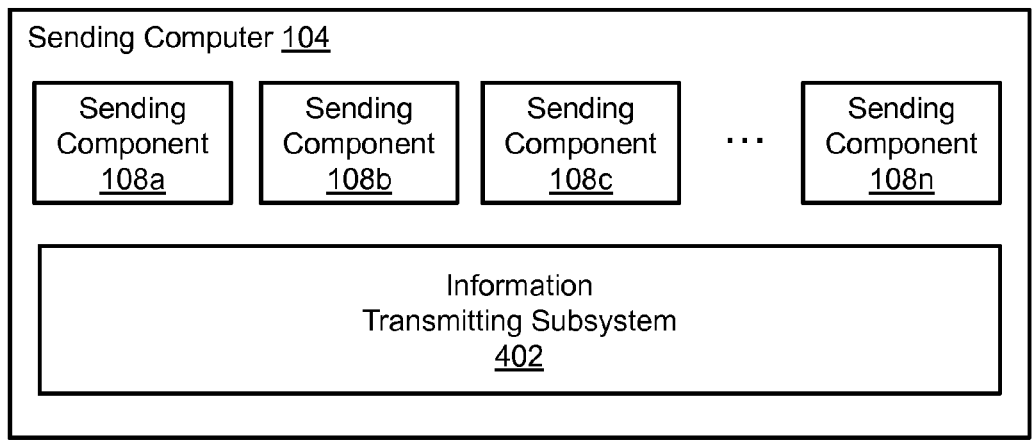
FIG. 4A is an exemplary illustration of a sending computer, according to aspects of the invention.

Referring to FIG. 4A, in some implementations, sending computer 104 may be programmed to combine different information to be transmitted into different slices of a data packet and/or encrypt the slices using different cryptographic schemes for secure transmission of the information. By way of example, sending computer 104 may receive first information to be transmitted, second information to be transmitted, or other information to be transmitted. The first information may be associated with a first sending component. The second information may be associated with a second sending component different than the first sending component. A sending component 108 may, for example, comprise components external to sending computer 104, components executing within sending computer 104, or other components.

Sending computer 104 may be programmed to generate a first data slice representing at least a portion of the first information, a second data slice representing at least a portion of the second information, or other data slices. The first data slice may be generated based on a first cryptographic scheme. The second data slice may be generated based on a second cryptographic scheme different than the first cryptographic scheme. As an example, generation of the first data slice based on the first cryptographic scheme may comprise encrypting the portion of the first information using a first encryption type or a first encryption key. Generation of the second data slice based on the second cryptographic scheme may comprise encrypting the portion of the second information using a second encryption type or a second encryption key that are different than the first encryption type or the first encryption key, respectively. Examples of encryption types may include one-time pad (OTP), Data Encryption Standard (DES), Advanced Encryption Standard (AES), or other encryption types.

Sending computer 104 may be programmed to generate a first header specifying the first cryptographic scheme for the first data slice, the second cryptographic scheme for the second data slice, or other information. Sending computer 104 may be programmed to generate a first data packet that includes the first header, the first data slice, the second data slice, or other data packet elements. The first data packet may then be transmitted to the appropriate receiving computer (e.g., receiving computer 106 or other receiving computer).

Figure 4B:
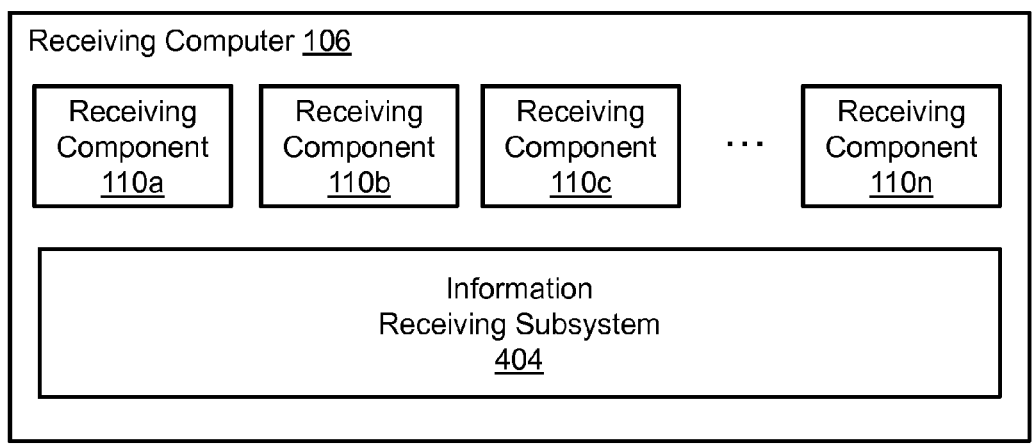
FIG. 4B is an exemplary illustration of a receiving computer, according to aspects of the invention.

In some implementations, with respect to FIG. 4A, sending computer 104 may comprise sending components 108a-108n, information transmitting subsystem 402, or other components. In another use case, with respect to FIG. 4B, receiving computer 106 may comprise receiving components 110a-110n, information receiving subsystem 404, or other components. It should be noted that, depending on the circumstances, a given sending component 108 may also be a receiving component, and a given receiving component 110 may also be a sending component. It should further be noted that, depending on the circumstances, sending computer 104 may be a receiving computer, and receiving computer 106 may be a sending computer. As an example, sending computer 104 may further comprise information receiving subsystem 404 or other component for processing received data packets where each of the received data packets include data slices associated with different information that are encrypted using different cryptographic schemes. As another example, receiving computer 106 may comprise information transmitting subsystem 402 or other component for combining different information to be transmitted into different slices of a data packet and/or encrypting the slices using different cryptographic schemes for secure transmission of the information.

As illustrated, in some implementations, sending computer 104 and receiving computer 106 may be pre-programmed to communicate with each other via data packets where each data packet include data slices that are associated with different information and that are encrypted using different cryptographic schemes. The pre-configuration of sending computer 104 and receiving computer 106 may, for example, establish a unique relationship between the two computers 104 and 106. The relationship between the two computers may, for example, define: (i) policies available to the two computers; (ii) a collection of pads (e.g., OTP) or other cryptographic schemes that are to be used to encrypt headers, data slices, or other data packet elements; (iii) status of the relationship (e.g., where the header in the next data packet should be located, which pad should currently be used, or other status information); or (iv) other characteristics of the relationship. While sending computer 104 may have other relationships with other computers, the other computers may not process data packets that are directed from sending computer 104 to receiving computer 106 as a result of the other relationships defining different policies, cryptographic schemes, relationship statuses, or other relationship characteristics. On the other hand, receiving computer 106 may process the data packets from sending computer 104 to obtain portions of information that are associated with different sending components 108 and combine the obtained portions to form the information that is thereafter provided to the appropriate receiving components 110.

In some implementations, referring to FIG. 5, sending computer 104 may receive information 502, 504, and 506 from sending components 108a, 108b, and 108c, respectively. In some implementations, sending components 108a, 108b, and 108c may include virtual machines, applications, or other components in sending computer 104. The information 502, 504, and 506 may include communication to be transmitted from sending components 108a, 108b, and 108c, respectively, to corresponding receiving components 110a, 110b, and 110c.

Sending computer 104 may generate data slices representing at least individual portions 502a-502n of information 502, data slices representing at least individual portions 504a-504n of information 504, and data slices representing at least individual portions 506a-506n of information 506. Data packets 508a-508n may be generated such that: (i) data packet 508a includes header 510a, portions 502a, 504a, and 506a, or other data packet elements; (ii) data packet 508b includes header 510b, portions 502b, 504b, and 506b, or other data packet elements; and (iii) so on. Header 510a may specify the cryptographic schemes used to encrypt the data slices representing portions 502a, 504a, and 506a. Header 510b may specify the cryptographic schemes used to encrypt the data slices representing portions 502b, 504b, and 506b. As an example, headers 510 may specify the cryptographic schemes by specifying a policy that should be used to interpret the headers 510 and specifying cryptographic scheme indexes of the policy that correspond to the cryptographic schemes. Further details with respect to policies and cryptographic scheme indexes are provided below.

Referring now to FIG. 5, data packets 508a-508n may be transmitted to receiving computer 106. Receiving computer 106 may process data packets 508a-508n to form information 502, 504, and 506, and provide information 502, 504, and 506 to their respective receiving components 110a, 110b, and 110c. As an example, receiving computer 106 may process headers 510a-510n to identify cryptographic schemes used to encrypt the data slices representing portions 502a-502n, cryptographic schemes used to encrypt the data slices representing portions 504a-504n, and cryptographic schemes used to encrypt the data slices representing portions 506a-506n. The data slices may be decrypted using the identified cryptographic schemes to obtain portions 502a-502n, 504a-504n, and 506a-506n. The corresponding portions may then be combined to form information 502, 504, and 506.

In some implementations, sending computer 104 may be programmed to generate a third data slice including randomly generated filler data. The third data slice may have a size different than a size of the first data slice or the second data slice. The first data packet may be generated such that the first data packet may include the third data slice. In this way, among other benefits, randomly generated filler data may be interleaved in data packets to provide another layer of camouflage for data actually representing portions of information. The data slices comprising the randomly generated filler data may be encrypted using a cryptographic scheme to further hide from unintended recipients the fact that the data slices comprising the randomly generated filler data do not represent portions of information. Additionally, or alternatively, sizes of the data slices comprising randomly generated filler data may be varied within a data packet to hide the start and end positions of data slices representing portions of information.

In a non-limiting example, referring to FIG. 5, each of data packets 508a-508n may include data slices comprising randomly generated filler data 512. When data packets 508a-508n are received by receiving computer 106, the data slices comprising randomly generated filler data (as opposed to portions of information) may be ignored. For example, the start and end positions of the data slices representing portions of information may be identified. The data slices representing portions of information may then be extracted, leaving the data slices comprising randomly generated filler data. Subsequently, the portions of information may be obtained by decrypting the extracted data slices.

In one implementation, the first header may specify a position of the first data slice within the first data packet, a position of the second data slice within the first data packet, a position of the third data slice within the first data packet, or other position information. By way of example, data packet headers may specify start positions of data slices, end positions of the data slices, sizes of the data slices, which of the data slices comprise randomly generated filler data, or other data-packet-related information by specifying a policy that should be used to interpret the data packet headers.

In some implementations, an example policy definition for a particular policy may be: {"Policy": {"Index": 0, "Name":"Standard ODEP", "SliceSizes": 128, 512, 32, 32, 128, 384, 268, 24, "TrafficModel": 2, "DataTypes": {0:"rand", 1: "otp", 2:"des", 3:"aes256"}}}. A data packet header may specify that the example policy should be used to interpret a data packet by specifying the policy index 0. Based on the policy definition, the traffic model corresponding to the traffic model index 2 may be utilized to determine positions of the data slices within the data packet, which of the data slices comprise randomly generated filler data, or other data-packet-related information. As discussed, in some implementations, policies or other policy-related information may be defined by a unique relationship established between a given sending computer and a given receiving computer. As an example, the policies that correspond to the policy index specified by a data packet header may be known only to the sending computer and the receiving computer sharing the unique relationship. As another example, a given sending computer may have a first relationship with a given receiving computer for secure transmission of information from the sending computer to the receiving computer (e.g., transmitting channel), and a second relationship for processing data packets that are received at the sending computer from the receiving computer (e.g., receiving channel). Each relationship may, for example, define different policies that are available for the relationship or other data-packet-related information.

Figure 6:
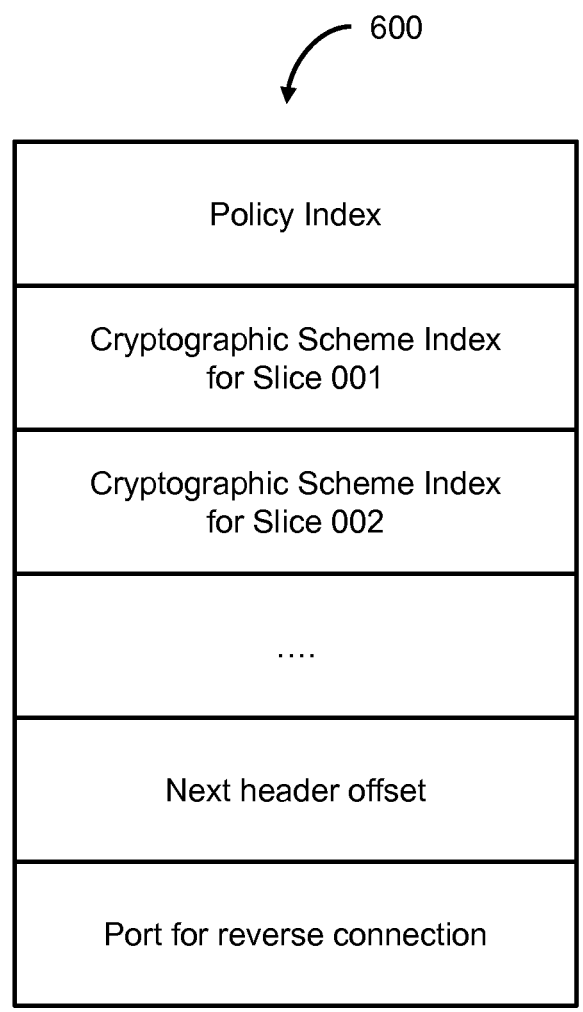
FIG. 6 is an exemplary illustration of a data packet header, according to an aspect of the invention.

In some implementations, referring to FIG. 6, data packet header 600 may specify a policy index representing a policy that should be used to interpret the data packet that includes data packet header 600 in the first set of bits, cryptographic scheme indexes representing cryptographic schemes that were used to encrypt the data slices in the data packet, a header offset that indicates the position of the header in the next data packet, a port for reverse connection, or other data-packet-related information.

In some implementations, sending computer 104 may be programmed to generate the first header based on a third cryptographic scheme. The third cryptographic scheme may be the same as one of the first or second cryptographic schemes, or may be different from both the first and the second cryptographic schemes. In one implementation, referring to FIG. 6, a particular pad may be used to encrypt data packet header 600. The pad used to encrypt data packet header 600 may, for example, be one of a collection of pads that are pre-configured as part of a unique relationship between a given sending computer and a given receiving computer.

In various implementations, sending computer 104 may be programmed to generate a first handshake request based on the third cryptographic scheme. The first handshake request may be transmitted to receiving computer 106. Sending computer 104 may receive a first response from receiving computer 106. The first header may be encrypted using the third cryptographic scheme based on the first response confirming use of the third cryptographic scheme for encrypting headers.

In some implementations, the first time sending computer 104 initiates a communication session with receiving computer 106 to securely transmit information to receiving computer 106, sending computer 104 may transmit a handshake packet with a handshake header. The handshake header may include a standard 24 bit header with no body and all bits of the header set to 0, and may be encrypted using a first pad that the relationship established between the two computers defined at index 0. If the handshake header is understood by receiving computer 106 (e.g., the pads at sending computer 104 and receiving computer 106 line up), receiving computer 106 may send a message as a reply specifying one of the pre-configured policies defined by the established relationship that should be used to generate data packets to securely transmit information and/or process the data packets to obtain portions of information from the data packets.

In some implementations, sending computer 104 may receive a reset request based on a failure of receiving computer 106 to process a data packet transmitted to receiving computer 106 prior to the first data packet being transmitted. The first handshake request may, for example, be generated based on the reset request. The first response received from receiving computer 106 may specify a first position within the first data packet for the first header. The first data packet may be generated such that the first data packet may include the first header at the first position within the first data packet. As an example, if receiving computer 106 loses track of the position of subsequent headers, is unable to decrypt a header, or otherwise fails to properly process a data packet transmitted from sending computer 104, receiving computer 106 may transmit a reset request to sending computer 104 to trigger handshaking between the two computers to determine the cryptographic scheme used to encrypt subsequent data packet headers, the initial position of the next data packet header, the policy to be used to generate/process data packets, or other information.

In certain implementations, sending computer 104 may be programmed to generate a first handshake request based on a fourth cryptographic scheme different than the third cryptographic scheme (for which generation of the first header is based). The first handshake request may be transmitted to receiving computer 106. Sending computer 104 may receive a first response from receiving computer 106. The first response may specify use of the third cryptographic scheme. The first response may, for example, specify use of the third cryptographic scheme by specifying a header index. Based on the header index corresponding to the third cryptographic scheme, sending computer 104 may be programmed to generate a second handshake request using the third cryptographic scheme. The second handshake request may be transmitted to receiving computer 106. A second response may be received from the second computer system. The second response may, for example, confirm use of the third cryptographic scheme for encrypting headers. The third cryptographic scheme may be used to encrypt the first header based on the second response confirming use of the third cryptographic scheme.

As discussed, in some implementations, the first time sending computer 104 initiates a communication session with receiving computer 106 to securely transmit information to receiving computer 106, sending computer 104 may transmit a handshake packet with a handshake header. The handshake header may be encrypted using a first pad that the relationship established between the two computers defines at index 0. If the handshake header is understood by receiving computer 106 (e.g., the pads line up), receiving computer 106 may send a message as a reply specifying one of the pre-configured policies defined by the established relationship that should be used to generate data packets to securely transmit information and/or process the data packets to obtain portions of information from the data packets.

On the other hand, if receiving computer 106 cannot read the header (e.g., due to pad misalignment or other reasons), receiving computer 106 may transmit the index of the next pad file to use to sending computer 104. Sending computer 104 may then reinitiate the communication session by transmitting a handshake packet with a handshake header encrypted using the pad corresponding to the index. In some implementations, a relationship between the two computers may be marked as invalid such that future connection attempts may be dropped if a predetermined number of attempts at handshaking fail.

In various implementations, sending computer 104 may be programmed to generate a third data slice representing at least a second portion of the first information, a fourth data slice representing at least a second portion of the second information, or other data slices. Sending computer 104 may be programmed to generate a second data packet that includes a second header, the third data slice, the fourth data slice, or other data packet elements. The second data packet may then be transmitted to the appropriate receiving computer (e.g., receiving computer 106 or other receiving computer).

In one implementation, the third data slice may be generated based on the first cryptographic scheme. The fourth data slice may be generated based on the second cryptographic scheme. Sending computer 104 may be programmed to generate the second header such that the second header may specify the first cryptographic scheme for the third data slice, the second cryptographic scheme for the fourth data slice, or other information.

In some implementations, the third data slice may be generated based on a cryptographic scheme different than the first cryptographic scheme. The fourth data slice may be generated based on a cryptographic scheme different than the second cryptographic scheme. Sending computer 104 may be programmed to generate the second header such that the second header may specify the cryptographic scheme different than the first cryptographic scheme for the third data slice, the cryptographic scheme different than the second cryptographic scheme for the fourth data slice, or other information.

In some implementations, the first header may be located at a first position within the first data packet. The first header may specify a second position within the second data packet for the second header. The second data packet may be generated such that the second data packet may include the second header at the second position within the second data packet that is specified by the first header. The second header may specify a position of the third data slice within the second data packet, a position of the fourth data slice within the second data packet, or other information. In this way, because header positions may be different from one data packet to the next data packet, identification of the cryptographic schemes used to encrypt the data slices and the corresponding data slices to which the cryptographic schemes have been applied may be made extremely difficult, if not impossible, for any component outside of the established relationship between sending computer 104 and receiving computer 106.

In certain implementations, the first data packet or the second data packet may be generated or transmitted during a first session. The second header may specify a third position within a third data packet for a third header. Sending computer 104 may be programmed to receive third information to be transmitted that is associated with the first sending component during a second session different than the first session. Sending computer 104 may be programmed to generate a fifth data slice representing at least a portion of the third information. Sending computer 104 may be programmed to generate the third data packet such that the third data packet may include the third header and the fifth data slice. The third data packet may then be transmitted to the appropriate receiving computer (e.g., receiving computer 106 or other receiving computer) during the second session. As such, in some scenarios, a data packet header may specify a position of the header in the next (or otherwise subsequent) data packet transmitted via an established relationship even where the next data packet is not generated until a subsequent communication session.

In one implementation, the fifth data slice may be generated based on the first cryptographic scheme. Sending computer 104 may be programmed to generate the third header such that the third header may specify the first cryptographic scheme for the fifth data slice.

In some implementations, the fifth data slice may be generated based on a cryptographic scheme different than the first cryptographic scheme. Sending computer 104 may be programmed to generate the third header such that the third header may specify the cryptographic scheme different than the first cryptographic scheme.

In various implementations, a first policy, a second policy, or other policies may be stored at sending computer 104 or in association with sending computer 104. The first header may specify the first cryptographic scheme for the first data slice and the second cryptographic scheme for the second data slice by specifying the first policy.

As discussed, in some implementations, an example policy definition for a particular policy may be: {"Policy": {"Index": 0, "Name":"Standard ODEP", "SliceSizes": 128, 512, 32, 32, 128, 384, 268, 24, "TrafficModel": 2, "DataTypes": {0:"rand", 1: "otp", 2:"des", 3:"aes256"}}. A data packet header may specify that the example policy should be used to interpret a data packet by specifying the policy index 0. When the policy index 0 is specified, the cryptographic schemes may be specified for the data slices using the cryptographic scheme indexes of the policy corresponding to the policy index 0 (e.g., index 1 for OTP, index 2 for DES, index 3 for AES256, etc.).

In some implementations, sending computer 104 may be programmed to receive a second data packet from receiving computer 106. The second data packet may include a second header, a third data slice, or other data packet elements. The third data slice may represent a portion of third information.

The second header may specify the second policy. Sending computer 104 may be configured to identify the first cryptographic scheme as a cryptographic scheme used to encrypt the third data slice based on the second header specifying the second policy. Sending computer 104 may be programmed to process the third data slice based on the first cryptographic scheme to obtain the portion of the third information. As such, in some implementations, cryptographic schemes specified by different policies may nonetheless overlap.

As discussed, in some implementations, policies or other policy-related information may be defined by a unique relationship established between a given sending computer and a given receiving computer. As an example, the policies that correspond to the policy index specified by a data packet header may be known only to the sending computer and the receiving computer sharing the unique relationship. As another example, a given sending computer may have a first relationship with a given receiving computer for secure transmission of information from the sending computer to the receiving computer, and a second relationship for processing data packets that are received at the sending computer from the receiving computer. Each relationship may, for example, define different policies that are available for the relationship or other data-packet-related information.

In one implementation, the first policy may specifies an association of a first cryptographic scheme index with the first cryptographic scheme, an association of a second cryptographic scheme index with the second cryptographic scheme, or other associations. The second policy may specify an association of a third cryptographic scheme index with the first cryptographic scheme or other associations. The first header may specify the first cryptographic scheme for the first data slice and the second cryptographic scheme for the second data slice by specifying the first policy, the first cryptographic scheme index for the first data slice, and the second cryptographic scheme index for the second data slice. The second header may specify the first cryptographic for the third data slice by specifying the second policy and the third cryptographic scheme index for the third data slice. The first cryptographic scheme may be identified as a cryptographic scheme used to encrypt the third data slice based on the second header specifying the second policy and the third cryptographic scheme index for the third data slice.

In certain implementations, receiving computer 106 may be programmed to process a data packet having data slices associated with different information that are encrypted using different cryptographic schemes. By way of example, receiving computer 106 may be programmed to receive a first data packet including a first header, a first data slice representing at least a portion of first information, a second data slice representing at least a portion of second information, or other data packet elements. The first communication may be associated with a first sending component. The second communication may be associated with a second sending component different than the first sending component. A receiving component may, for example, comprise components external to receiving computer 106, components executing within receiving computer 106 (e.g., virtual machines, applications, or other components executing within sending computer 104), or other components.

Receiving computer 106 may be programmed to identify a first cryptographic scheme as a cryptographic scheme used to encrypt the first data slice, a second cryptographic scheme as a cryptographic scheme used to encrypt the second data slice, or other information based on the first header. As an example, encryption of the first data slice using the first cryptographic scheme may comprise encrypting the portion of the first information using a first encryption type or a first encryption key. Encryption of the second data slice using the second cryptographic scheme may comprise encrypting the portion of the second information using a second encryption type or a second encryption key that are different than the first encryption type or the first encryption key, respectively. As discussed, examples of encryption types may include OTP, DES, AES, or other encryption types.

Receiving computer 106 may be programmed to process the first data slice based on the first cryptographic scheme to obtain the portion of the first information, and process the second data slice based on the second cryptographic scheme to obtain the portion of the second information.

In some implementations, receiving computer 106 may be programmed to receive a second data packet including a second header, a third data slice representing at least a second portion of the first information, a fourth data slice representing at least a second portion of the second information, or other data packet elements. Receiving computer 106 may be programmed to identify the first cryptographic scheme as a cryptographic scheme used to encrypt the third data slice, the second cryptographic scheme as a cryptographic scheme used to encrypt the fourth data slice, or other information based on the second header. Receiving computer 106 may be programmed to process the third data slice based on the first cryptographic scheme to obtain the second portion of the first information, and process the fourth data slice based on the second cryptographic scheme to obtain the second portion of the second information.

Receiving computer 106 may be programmed to combine the portion of the first information and the second portion of the first information to form the first information for a first receiving component, and combine the portion of the second information and the second portion of the second information to form the second information for a second receiving component.

For example, with respect to FIG. 5, data packets 508*a*-508*n* that are received by receiving computer 106 may comprise: (i) data packet 508*a* having header 510*a*, portions 502*a*, 504*a*, and 506*a*, or other data packet elements; (ii) data packet 508*b* having header 510*b*, portions 502*b*, 504*b*, and 506*b*, or other data packet elements; and (iii) so on. Header 510*a* may specify the cryptographic schemes used to encrypt the data slices representing portions 502*a*, 504*a*, and 506*a*. Header 510*b* may specify the cryptographic schemes used to encrypt the data slices representing portions 502*b*, 504*b*, and 506*b*.

Receiving computer 106 may process data packets 508*a*-508*n* to form information 502, 504, and 506, and provide information 502, 504, and 506 to their respective receiving components 110*a*, 110*b*, and 110*c*. As an example, receiving computer 106 may process headers 510*a*-510*n* to identify the cryptographic schemes used to encrypt the data slices representing portions 502*a*-502*n*, cryptographic schemes used to encrypt the data slices representing portions 504*a*-504*n*, and cryptographic schemes used to encrypt the data slices representing portions 506*a*-506*n*. The data slices may be decrypted using the identified cryptographic schemes to obtain portions 502*a*-502*n*, 504*a*-504*n*, and 506*a*-506*n*. The corresponding portions may then be combined to form information 502, 504, and 506.

In one implementation, the first header may be located at a first position within the first data packet. The first header may specify a second position within the second data packet for the second header. The second data packet may include the second header at the second position within the second data packet that is specified by the first header. In this way, because header positions may be different from one data packet to the next data packet, identification of the cryptographic schemes used to encrypt the data slices and the corresponding data slices to which the cryptographic schemes have been applied may be made extremely difficult, if not impossible, for any component outside of the established relationship between sending computer 104 and receiving computer 106.

In some implementations, the first data packet and/or the second data packet may include randomly generated filler data. As discussed, randomly generated filler data may be interleaved in data packets to provide another layer of camouflage for data actually representing portions of information. The data slices comprising the randomly generated filler data may be encrypted using a cryptographic scheme to further hide from unintended recipients the fact that the data slices comprising the randomly generated filler data do not represent portions of information. Additionally, or alternatively, sizes of the data slices comprising randomly generated filler data may be varied within a data packet to hide the start and end positions of data slices representing portions of information.

As indicated, with respect to FIG. 5, each of data packets 508a-508n may include data slices comprising randomly generated filler data 512. When data packets 508a-508n are received by receiving computer 106, the data slices comprising randomly generated filler data (as opposed to portions of information) may be ignored. For example, the start and end positions of the data slices representing portions of information may be identified. The data slices representing portions of information may then be extracted, leaving the data slices comprising randomly generated filler data. Subsequently, the portions of information may be obtained by decrypting the extracted data slices.

In various implementations, receiving computer 106 may be programmed to process the first header using a third cryptographic scheme to identify the first cryptographic scheme as a cryptographic scheme used to encrypt the first data slice, the second cryptographic scheme as a cryptographic scheme used to encrypt the second data slice, or other header information. The third cryptographic scheme may be the same as one of the first or second cryptographic schemes, or may be different from both the first and the second cryptographic schemes. In one scenario, particular pad may be used to encrypt the data packet header 600 (illustrated in FIG. 6). The pad used to encrypt data packet header 600 may, for example, be one of a collection of pads that are pre-configured as part of a unique relationship between a given sending computer and a given receiving computer.

Referring back to FIG. 5, in some implementations, the first data packet may be received from sending computer 104. Receiving computer 106 may be programmed to receive a first handshake request from sending computer 104. The first handshake request may be generated based on the third cryptographic scheme. Receiving computer 106 may be programmed to generate a first response confirming use of the third cryptographic scheme for generating headers. The first response may be transmitted to sending computer 104. The first header may, for example, be generated using the third cryptographic scheme based on the first response.

As discussed, in some implementations, the first time sending computer 104 initiates a communication session with receiving computer 106 to securely transmit information to receiving computer 106, sending computer 104 may transmit a handshake packet with a handshake header. The handshake header may be encrypted using a first pad that the relationship established between the two computers defines at index 0. If the handshake header is understood by receiving computer 106 (e.g., the pads line up), receiving computer 106 may send a message as a reply specifying one of the pre-configured policies defined by the established relationship that should be used to generate data packets to securely transmit information and/or process the data packets to obtain portions of information from the data packets.

In one implementation, receiving computer 106 may be programmed to generate a reset request based on a failure to process a data packet received prior to the first data packet being received. The reset request may be transmitted to sending computer 104. The first handshake request may be received from sending computer 104 based on the transmission of the reset request. The first response that is transmitted to sending computer 104 may specify a first position within the first data packet for the first header. The first data packet may be generated such that the first data packet may include the first header at the first position within the first data packet. By way of example, if receiving computer 106 loses track of the position of subsequent headers, is unable to decrypt a header, or otherwise fails to properly process a data packet transmitted from sending computer 104, receiving computer 106 may transmit a reset request to sending computer 104 to trigger handshaking between the two computers to determine the cryptographic scheme used to encrypt subsequent data packet headers, the initial position of the next data packet header, the policy to be used to generate/process data packets, or other information.

In certain implementations, sending computer 104 may be programmed to secure information using data packets having headers that start at different positions within a data packet with respect to other data packets. By way of example, sending computer 104 may be programmed to receive first information to be transmitted. The first information may be associated with a first sending component.

Sending computer 104 may be programmed to generate a first data slice representing at least a first portion of the first information, a second data slice representing at least a second portion of the first information, or other data slices. Sending computer 104 may be programmed to generate a first data packet including a first header, the first data slice, or other data packet elements. The first data packet may be generated such that the first header may be located at a first position within the first data packet. The first data packet may be generated such that the first header may specify a second position within a second data packet for a second header. Sending computer 104 may be programmed to generate the second data packet such that the second data packet may include the second header, the second data slice, or other data packet elements. The second data packet may be generated such that the second header may be located at the second position within the second data packet that is specified by the first header. The first data packet and the second data packet may be transmitted to an appropriate receiving computer (e.g., receiving computer 106 or other receiving computer). In this way, because header positions may be different from one data packet to the next data packet, identification of the cryptographic schemes used to encrypt the data slices and the corresponding data slices to which the cryptographic schemes have been applied may be made extremely difficult, if not impossible, for any component outside of the established relationship between sending computer 104 and receiving computer 106.

In some implementations, sending computer 104 may be programmed to generate the first header based on a first cryptographic scheme and the second header based on the first cryptographic scheme. The first data slice and the second data slice may each be generated based on a second cryptographic scheme different than the first cryptographic scheme.

In one implementation, the first information may be received during a first session. The second header may specify a third position within a third data packet for a third header. Sending computer 104 may be programmed to receive second information during a second session different than the first session. Sending computer 104 may be programmed to generate a third data slice representing at least a portion of the second information. Sending computer 104 may be programmed to generate the third data packet such that the third data packet may include the third header, the third data slice, or other data packet elements. The third data packet may be generated such that the third header may be located at the third position within the third data packet that is specified by the second header. The third data packet may be transmitted to an appropriate receiving computer (e.g., receiving computer 106 or other receiving computer). As such, in some scenarios, a data packet header may specify a position of the header in the next (or otherwise subsequent) data packet transmitted via an established relationship even where the next data packet is not generated until a subsequent communication session.

In certain implementations, receiving computer 106 may be programmed to process data packets having headers that start at different positions within a data packet with respect to other data packets. By way of example, receiving computer 106 may be programmed to receive a first data packet, a second data packet, or other data packets. The first data packet may include a first header, a first data slice representing a first portion of first information, or other data packet elements. The second data packet may include a second header, a second data slice representing a second portion of the first information, or other data packet elements.

Receiving computer 106 may be programmed to identify the first header at a first position within the first data packet. Receiving computer 106 may be programmed to identify the second header at a second position within the second data packet based on the first header specifying the second position for the second header. Receiving computer 106 may be programmed to identify the first data slice within the first data packet based on the first header, and the second data slice within the second data packet based on the second header.

Receiving computer 106 may be programmed to process the first data slice to obtain the first portion of the first information, and the second data slice to obtain the second portion of the first information. Receiving computer 106 may be programmed to combine the first portion of the first information and the second portion of the first information to form the first information.

In some implementations, receiving computer 106 may be programmed to identify a first cryptographic scheme used to encrypt the first header. Receiving computer 106 may be programmed to process the first header using the first cryptographic scheme to identify a second cryptographic scheme used to encrypt the first data slice. The second cryptographic scheme may be different than the first cryptographic scheme. The first data slice may be processed using the second cryptographic scheme to obtain the first portion of the first information. The second data slice may be processed using the second cryptographic scheme to obtain the second portion of the first information.

Figure 7:
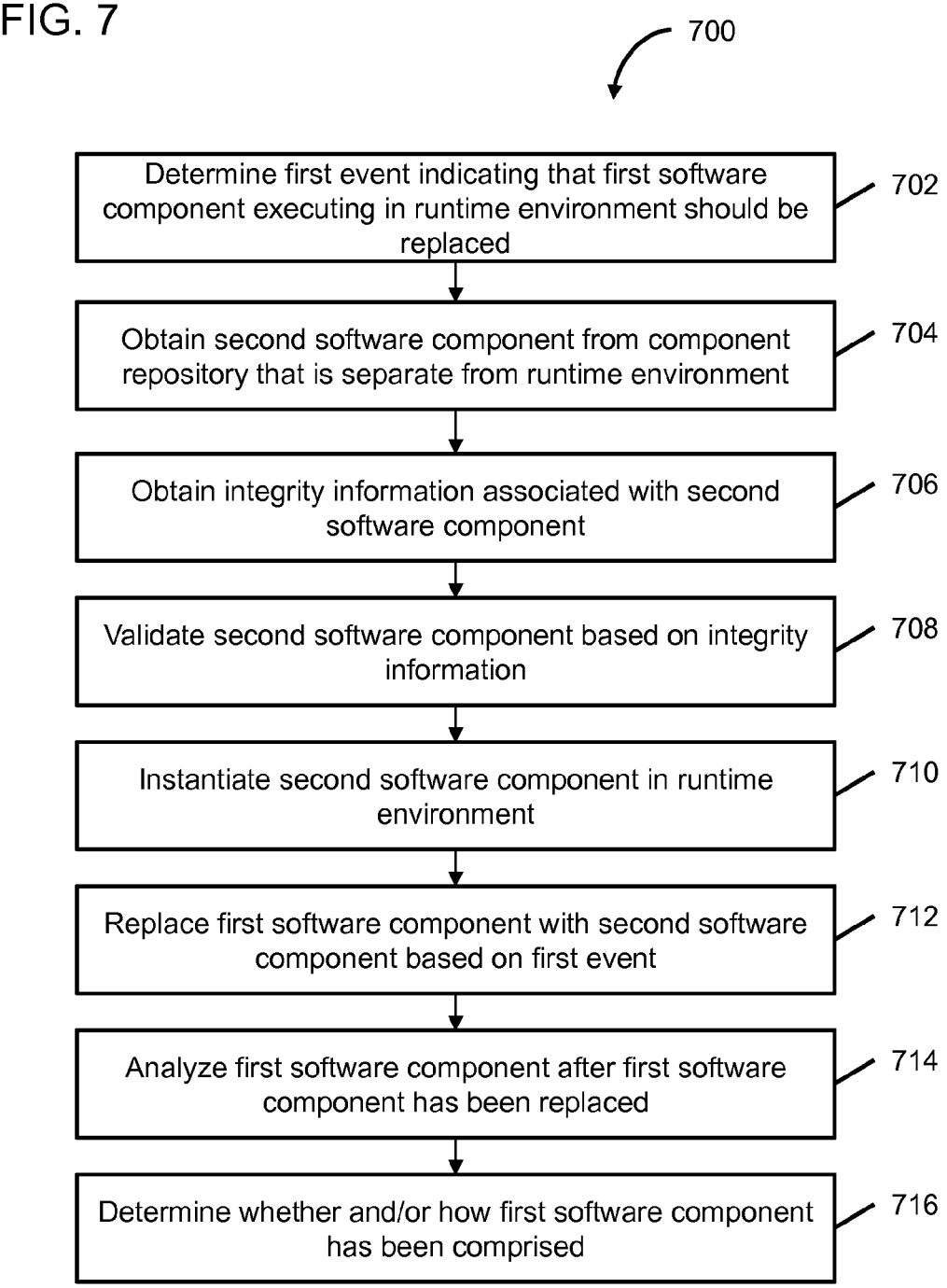
FIG. 7 is an exemplary illustration of a flowchart of a method for replacing software components executing in a runtime environment with corresponding known-good software components, according to an aspect of the invention.

FIG. 7 is an exemplary illustration of a flowchart of a method for replacing software components executing in a runtime environment with corresponding known-good software components, according to an aspect of the invention. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, at least a first event indicating that at least a first software component executing in the runtime environment should be replaced may be determined. The first event may, for example, be determined without respect to whether the first software component has been compromised or potentially compromised. In some implementations, the first event may include a passage of one or more replacement time intervals, a number of uses of the first software component reaching or exceeding a use threshold, an availability of an updated version of the first software component, and/or other event. Operation 702 may be performed by a component manager subsystem that is the same as or similar to component manager subsystem 112, in accordance with one or more implementations.

At an operation 704, at least a second software component that corresponds to the first software component may be obtained from a component repository that is separate from the runtime environment. Operation 704 may be performed by a component manager subsystem that is the same as or similar to component manager subsystem 112, in accordance with one or more implementations.

At an operation 706, integrity information associated with the second software component may be obtained. Operation 706 may be performed by a component manager subsystem that is the same as or similar to component manager subsystem 112, in accordance with one or more implementations.

At an operation 708, the second software component may be validated based on the integrity information. Operation 708 may be performed by a component manager subsystem that is the same as or similar to component manager subsystem 112, in accordance with one or more implementations.

At an operation 710, the second software component may be instantiated in the run-time environment. The second software component may be instantiated in an inactive path such that the second software component is not available for use in the runtime environment. In some implementations, the second software component may be instantiated based on the second software component being validated via the integrity information. Operation 710 may be performed by a component manager subsystem that is the same as or similar to component manager subsystem 112, in accordance with one or more implementations.

At an operation 712, the first software component may be replaced with the second software component based on the first event (indicating that at least the first software component should be replaced). Operation 712 may be performed by a component manager subsystem that is the same as or similar to component manager subsystem 112, in accordance with one or more implementations.

In certain implementations, with respect to operation 712, the first event may include a passage of one or more replacement time intervals, a number of uses of the first software component reaching or exceeding a use threshold, an availability of an updated version of the first software component, or other condition. As an example, the first software component may be replaced after passage of the one or more replacement time intervals. The second software component may be replaced after a second passage of the one or more replacement time intervals. As another example, the first software component may be replaced based on a number of uses of the first software component reaching or exceeding the use threshold. As another example, the first software component may be replaced based on an updated version of the first software component being available. The second software component may comprise the updated version.

In various implementations, with respect to operation 712, the replacement of the first software component with the second software component may comprise placing the second software component in an active path such that the second software component is available for use in the runtime environment. In one implementation, the first software component and the second software component may each include a virtual machine, and the placement of the second software component in the active path may comprise updating a network configuration associated with the second software component such that the second software component is available for use at the runtime environment. In another implementation, the first software component and the second software component may each include an operating system process, and the placement of the second software component in the active path may comprise moving the second software component into the active path via inter-process communication configuration. In another implementation, the first software component and the second software component may each include executable code, and the placement of the second software component in the active path may comprise updating a memory address pointer or a lookup table associated with the second software component.

In some implementations, with respect to operation 712, the replacement of the first software component with the second software component may further comprise moving the first software component out of the active path. In one implementation, the first software component may be moved out of the active path after the second software component is placed in the active path.

At an operation 714, the first software component may be analyzed after the first software component has been replaced. Operation 714 may be performed by a component analysis subsystem that is the same as or similar to component analysis subsystem 116, in accordance with one or more implementations.

At an operation 716, a determination of whether and/or how the first software component has been comprised may be effectuated. For example, a determination of whether and/or how the first software component has been comprised may be effectuated based on the analysis of the first software component. Operation 716 may be performed by a component manager subsystem that is the same as or similar to component manager subsystem 112, in accordance with one or more implementations.

Figure 8:
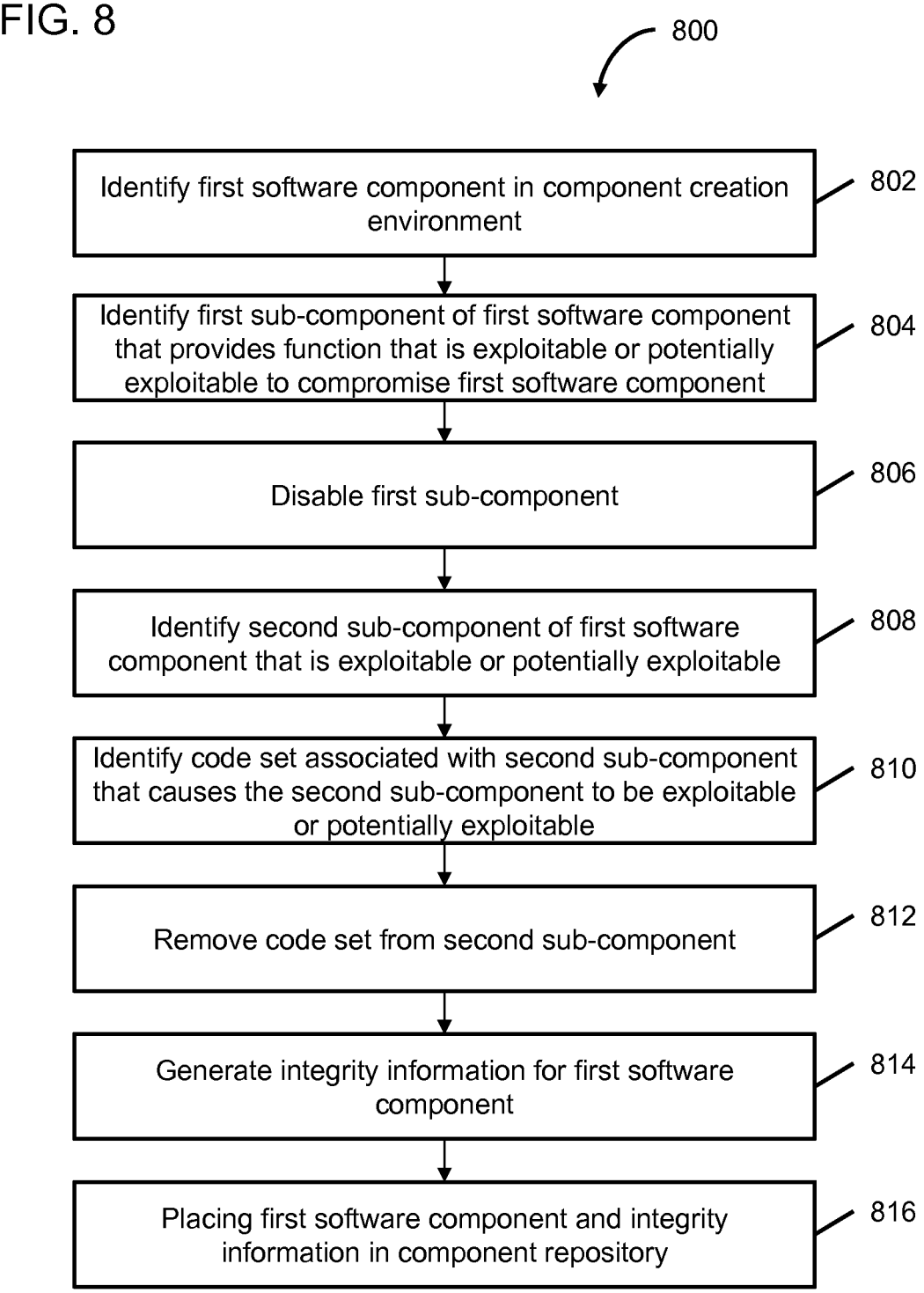
FIG. 8 is an exemplary illustration of a flowchart of a method for limiting exploitable or potentially exploitable sub-components in software components, according to an aspect of the invention.

FIG. 8 is an exemplary illustration of a flowchart of a method for limiting exploitable or potentially exploitable sub-components in software components, according to an aspect of the invention. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, at least a first software component in a component creation environment may be identified. The first software component may include a first sub-component that provides a function that is exploitable or potentially exploitable to compromise the first software component. The first software component may further include a second sub-component that is exploitable or potentially exploitable to compromise the first software component. Operation 802 may be performed by a component sealing subsystem that is the same as or similar to component sealing subsystem 304, in accordance with one or more implementations.

At an operation 804, the first sub-component of the first software component may be identified. In some implementations, the function provided by the first sub-component may include a maintenance function or an administrative function used to maintain the first software component. The first sub-component may be identified based on the maintenance function or the administrative function provided by the first sub-component. Operation 804 may be performed by a component sealing subsystem that is the same as or similar to component sealing subsystem 304, in accordance with one or more implementations.

At an operation 806, the first sub-component may be disabled. For example, the first sub-component may be disabled such that the function provided by the first sub-component will not be available when the first sub-component is executed. In certain implementations, disabling the first sub-component may comprise removing the first sub-component from the first software component. In some implementations, disabling the first sub-component may comprise turning off the function provided by the first sub-component without removing the first sub-component from the first software component. In various implementations, disabling the first sub-component may comprise associating the first software component with disabling instructions. As an example, the disabling instructions may be associated with the first software component such that the first sub-component will be removed from the first software component based on the disabling instructions. As another example, the disabling instructions may be associated with the first software component such that the function provided by the first sub-component will be turned off based on the disabling instructions. Operation 806 may be performed by a component sealing subsystem that is the same as or similar to component sealing subsystem 304, in accordance with one or more implementations.

In certain implementations, the first software component may be generated in the component creation environment such that the first software component includes the first sub-component, the second sub-component, or other sub-component. First profile information may be associated with the first software component. The first profile information may, for example, used to determine whether a given sub-component of a given software component should be disabled. The first sub-component may be disabled based on the first profile information. The second sub-component may not be disabled based on the first profile information. Generation of the first software component and the association of the first profile information with the first software component may be performed by a component authoring subsystem that is the same as or similar to component authoring subsystem 302, in accordance with one or more implementations.

At an operation 808, a second sub-component of the first software component may be identified. The second sub-component may be identified as a sub-component that is exploitable or potentially exploitable. In some implementations, the first sub-component may be disabled based on a determination that the first sub-component is not necessary for functioning of the first software component. The second sub-component may not be disabled based on a determination that the second sub-component necessary for the functioning of the first software component Operation 808 may be performed by a component sealing subsystem that is the same as or similar to component sealing subsystem 304, in accordance with one or more implementations.

At an operation 810, a code set associated with the second sub-component that causes the second sub-component to be exploitable or potentially exploitable may be identified. Operation 810 may be performed by a component sealing subsystem that is the same as or similar to component sealing subsystem 304, in accordance with one or more implementations.

At an operation 812, the code set may be removed from the second sub-component. For example, the code set may be removed from the second sub-component such that the second sub-component no longer includes the code set. Operation 812 may be performed by a component sealing subsystem that is the same as or similar to component sealing subsystem 304, in accordance with one or more implementations.

At an operation 814, integrity information may be generated for the first software component. For example, the integrity information may be generated for the first software component after the first sub-component is disabled, after the code set is removed from the second sub-component, and before the first software component is placed in a component repository that is separate from the component creation environment. The integrity information may, for example, be used to determine whether the first software component has been modified after the integrity information is generated for the first software component. Operation 814 may be performed by a component exporting subsystem that is the same as or similar to component exporting subsystem 306, in accordance with one or more implementations.

At an operation 816, the first software component and the integrity information may be placed in the component repository. Operation 816 may be performed by a component exporting subsystem that is the same as or similar to component exporting subsystem 306, in accordance with one or more implementations.

Figure 9:
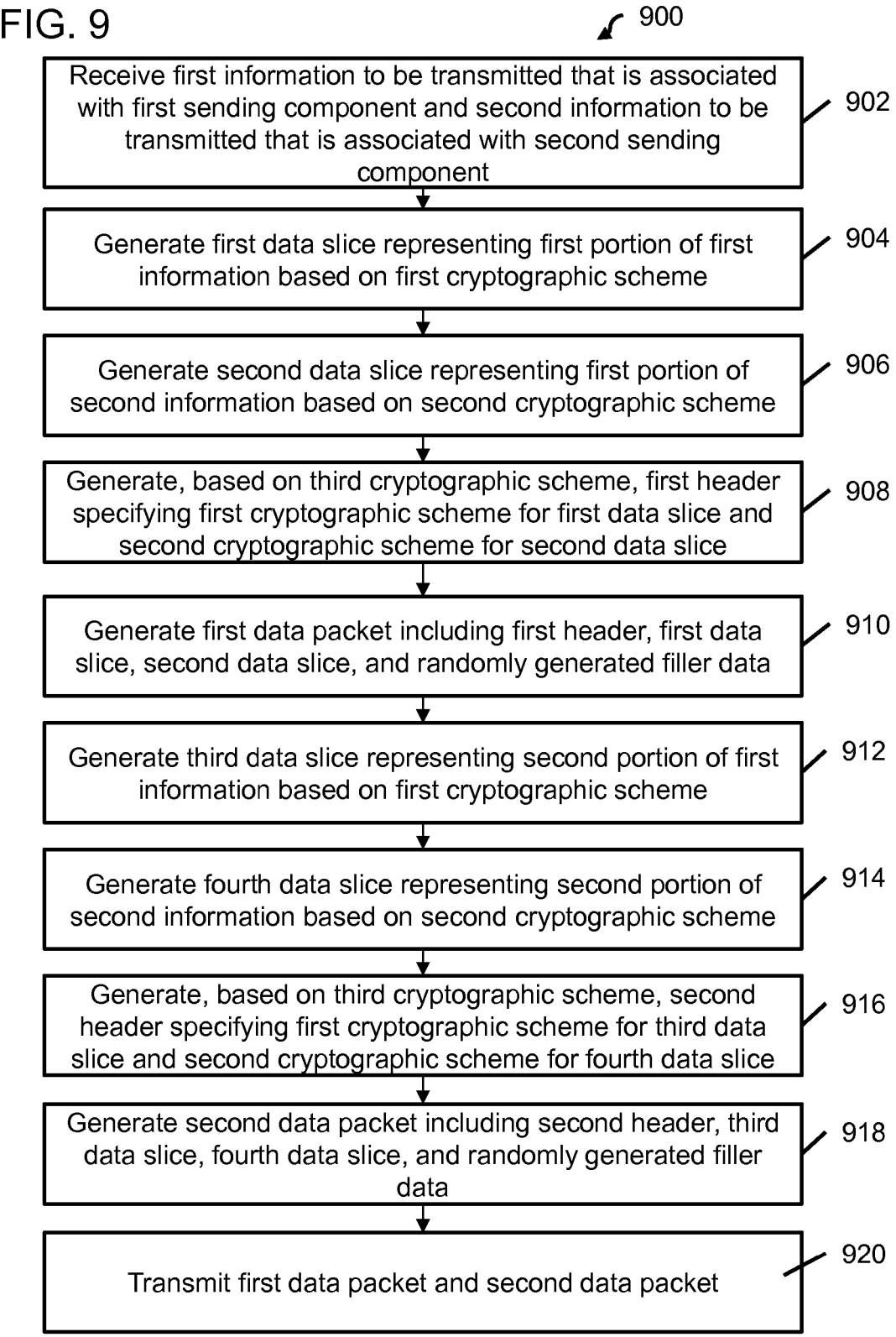
FIG. 9 is an exemplary illustration of a flowchart of a method for combining different information to be transmitted into different slices of a data packet and encrypting the slices using different cryptographic schemes for secure transmission of the information, according to an aspect of the invention.

FIG. 9 illustrates a method of combining different information to be transmitted into different slices of a data packet and encrypting the slices using different cryptographic schemes for secure transmission of the information, according to an aspect of the invention. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

In some implementations, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 902, first information to be transmitted and second information to be transmitted may be received. The first information may be associated with a first sending component. The second information may be associated with a second sending component. Operation 902 may be performed by a communication subsystem that is the same as or similar to information transmitting subsystem 402, in accordance with one or more implementations.

At an operation 904, a first data slice may be generated based on a first cryptographic scheme. The first data slice may be generated such that the first data slice represents at least a first portion of the first information. The first portion of the first information may, for example, be encrypted using the first cryptographic scheme to generate the first data slice. Operation 904 may be performed by a communication subsystem that is the same as or similar to information transmitting subsystem 402, in accordance with one or more implementations.

At an operation 906, a second data slice may be generated based on a second cryptographic scheme. The second data slice may be generated such that the second data slice represents at least a first portion of the second information. The first portion of the second information may, for example, be encrypted using the second cryptographic scheme to generate the second data slice. Operation 906 may be performed by a communication subsystem that is the same as or similar to information transmitting subsystem 402, in accordance with one or more implementations.

At an operation 908, a first header may be generated based on a third cryptographic scheme. The first header may be generated such that the first header specifies the first cryptographic scheme for the first data slice and the second cryptographic scheme for the second data slice. The first header may, for example, be encrypted using the third cryptographic scheme. Operation 908 may be performed by a communication subsystem that is the same as or similar to information transmitting subsystem 402, in accordance with one or more implementations.

In some implementations, with respect to operation 908, the first header may be generated such that the first header specifies a position of the first data slice within a data packet, a position of the second data slice within a data packet, or positions of other data slices within a data packet.

In certain implementations, with respect to operation 908, a first handshake request may be generated at a first computer system (at which the first header is generated) based on the third cryptographic scheme. The first handshake request may be transmitted to a second computer system. A first response may be received from the second computer system. The first response may, for example, confirm use of the third cryptographic scheme for encrypting headers. The third cryptographic scheme may be used to encrypt the first header based on the first response confirming use of the third cryptographic scheme. In some implementations, a reset request may be received at the first computer system based on a failure of the second computer system to process a data packet transmitted to the second computer system (e.g., prior to generation of the first header). The first handshake request may, for example, be generated based on the reset request. Such operations may be performed by a communication subsystem that is the same as or similar to information transmitting subsystem 402, in accordance with one or more implementations.

In various implementations, with respect to operation 908, a first handshake request may be generated at a first computer system (at which the first header is generated) based on a fourth cryptographic scheme. The first handshake request may be transmitted to a second computer system. A first response may be received from the second computer system. The first response may specify use of the third cryptographic scheme. The first response may, for example, specify use of the third cryptographic scheme by specifying a header index. A second handshake request may be generated using the third cryptographic scheme based on the header index corresponding to the third cryptographic scheme. The second handshake request may be transmitted to the second computer system. A second response may be received from the second computer system. The second response may, for example, confirm use of the third cryptographic scheme for encrypting headers. The third cryptographic scheme may be used to encrypt the first header based on the second response confirming use of the third cryptographic scheme. Such operations may be performed by a communication subsystem that is the same as or similar to information transmitting subsystem 402, in accordance with one or more implementations.

At an operation 910, a first data packet may be generated. The first data packet may be generated such that the first data packet includes the first header, the first data slice, the second data slice, randomly generated filler data, or other data. In some implementations, the first data packet may be generated such that the first data packet includes the first data slice, the second data slice, or other data slices at positions within the first data packet that are specified by the first header for the first data slice, the second data slice, or other data slices. Operation 910 may be performed by a communication subsystem that is the same as or similar to information transmitting subsystem 402, in accordance with one or more implementations.

At an operation 912, a third data slice may be generated based on the first cryptographic scheme. The third data slice may be generated such that the third data slice represents at least a second portion of the first information. The second portion of the first information may, for example, be encrypted using the first cryptographic scheme to generate the third data slice. Operation 912 may be performed by a communication subsystem that is the same as or similar to information transmitting subsystem 402, in accordance with one or more implementations.

At an operation 914, a fourth data slice may be generated based on the second cryptographic scheme. The fourth data slice may be generated such that the fourth data slice represents at least a second portion of the second information. The second portion of the second information may, for example, be encrypted using the second cryptographic scheme to generate the fourth data slice. Operation 914 may be performed by a communication subsystem that is the same as or similar to information transmitting subsystem 402, in accordance with one or more implementations.

At an operation 916, a second header may be generated based on the third cryptographic scheme. The second header may be generated such that the second header specifies the first cryptographic scheme for the third data slice and the second cryptographic scheme for the fourth data slice. The second header may, for example, be encrypted using the third cryptographic scheme. Operation 916 may be performed by a communication subsystem that is the same as or similar to information transmitting subsystem 402, in accordance with one or more implementations.

At an operation 918, a second data packet may be generated. The second data packet may be generated such that the second data packet includes the second header, the third data slice, the fourth data slice, randomly generated filler data, or other data. In some implementations, the second data packet may be generated such that the second data packet includes the third data slice, the fourth data slice, or other data slices at positions within the second data packet that are specified by the second header for the third data slice, the fourth data slice, or other data slices. Operation 918 may be performed by a communication subsystem that is the same as or similar to information transmitting subsystem 402, in accordance with one or more implementations.

In certain implementations, with respect to operations 908, 910, and 918, the first data packet may be generated such that the first data packet includes the first header at a first position within the first data packet. The first header may be generated such that the first header specifies a second position within the second data packet for the second header to be located. The second data packet may be generated such that the second data packet includes the second header at the second position that is specified by the first header.

At an operation 920, the first data packet and the second data packet may be transmitted. The first data packet and the second data packet may, for example, be transmitted from a first computer system (at which the first data packet and the second data packet are generated) to a second computer system. Operation 920 may be performed by a communication subsystem that is the same as or similar to information transmitting subsystem 402, in accordance with one or more implementations.

Figure 10:
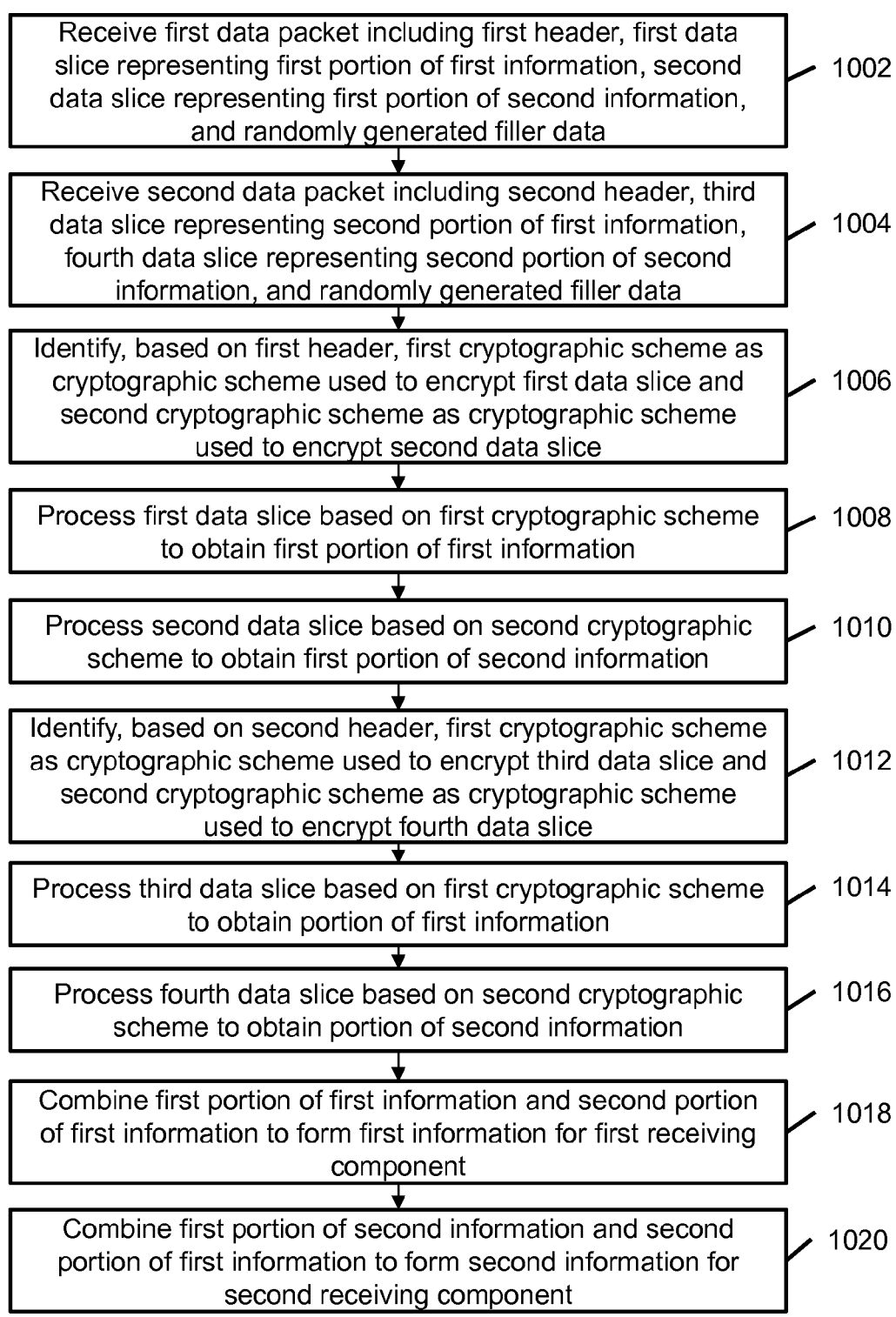
FIG. 10 is an exemplary illustration of a flowchart of a method for processing a data packet having data slices associated with different information that are encrypted using different cryptographic schemes, according to an aspect of the invention.

FIG. 10 illustrates a method of processing a data packet having data slices associated with different information that are encrypted using different cryptographic schemes, according to an aspect of the invention. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, a first data packet may be received. The first data packet may include a first header, a first data slice, a second data slice, or other data. The first data slice may represent at least a first portion of first information. The second data slice may represent at least a first portion of second information. The first information may be associated with a first sending component. The second information may be associated with a second sending component. The second sending component may be different than the first sending component. Operation 1002 may be performed by a communication subsystem that is the same as or similar to information receiving subsystem 404, in accordance with one or more implementations.

At an operation 1004, a second data packet may be received. The second data packet may include a second header, a third data slice, a fourth data slice, or other data. The third data slice may represent at least a second portion of the first information. The fourth data slice may represent at least a second portion of the second information. In some implementations, the first header may be located at a first position within the first data packet. The first header may specify a second position within the second data packet for the second header to be located. Operation 1004 may be performed by a communication subsystem that is the same as or similar to information receiving subsystem 404, in accordance with one or more implementations.

At an operation 1006, a first cryptographic scheme may be identified as a cryptographic scheme used to encrypt the first data slice. A second cryptographic scheme may be identified as a cryptographic scheme used to encrypt the second data slice. The identification of the first cryptographic scheme or the identification of the second cryptographic scheme may be based on the first header. Operation 1006 may be performed by a communication subsystem that is the same as or similar to information receiving subsystem 404, in accordance with one or more implementations.

In certain implementations, with respect to operation 1006, the first header may be processed using a third cryptographic scheme to identity the first cryptographic scheme as a cryptographic scheme used to encrypted the first data slice, identify the second cryptographic scheme as a cryptographic scheme used to encrypt the second data slice, or identify other cryptographic schemes used to encrypt other data slices. In some implementations, a reset request may be generated at a first computer system (at which the first header is processed) based on a failure to process a data packet received prior to the first data packet being received. The reset request may be transmitted to a second computer system from which the first data packet is subsequently received. A handshake request may be received at the first computer system from the second computer system based on the transmission of the reset request. The handshake request may be generated based on the third cryptographic scheme. A response confirming use of the third cryptographic scheme for generating headers may be generated. The response may be transmitted to the second computer system. The first header may, for example, be generated using the third cryptographic scheme based on the response. Such operations may be performed by a communication subsystem that is the same as or similar to information receiving subsystem 404, in accordance with one or more implementations.

At an operation 1008, the first data slice may be processed based on the first cryptographic scheme to obtain the first portion of the first information. Operation 1008 may be performed by a communication subsystem that is the same as or similar to information receiving subsystem 404, in accordance with one or more implementations.

At an operation 1010, the second data slice may be processed based on the second cryptographic scheme to obtain the first portion of the second information. Operation 1010 may be performed by a communication subsystem that is the same as or similar to information receiving subsystem 404, in accordance with one or more implementations.

At an operation 1012, the first cryptographic scheme may be identified as a cryptographic scheme used to encrypt the third data slice. The second cryptographic scheme may be identified as a cryptographic scheme used to encrypt the fourth data slice. The identification of the first cryptographic scheme or the identification of the second cryptographic scheme may be based on the second header. Operation 1012 may be performed by a communication subsystem that is the same as or similar to information receiving subsystem 404, in accordance with one or more implementations.

In various implementations, with respect to operation 1012, the second header may be processed using a third cryptographic scheme to identity the first cryptographic scheme as a cryptographic scheme used to encrypted the third data slice, identify the second cryptographic scheme as a cryptographic scheme used to encrypt the fourth data slice, or identify other cryptographic schemes used to encrypt other data slices. Such operations may be performed by a communication subsystem that is the same as or similar to information receiving subsystem 404, in accordance with one or more implementations.

At an operation 1014, the third data slice may be processed based on the first cryptographic scheme to obtain the second portion of the first information. Operation 1014 may be performed by a communication subsystem that is the same as or similar to information receiving subsystem 404, in accordance with one or more implementations.

At an operation 1016, the fourth data slice may be processed based on the second cryptographic scheme to obtain the second portion of the second information. Operation 1016 may be performed by a communication subsystem that is the same as or similar to information receiving subsystem 404, in accordance with one or more implementations.

At an operation 1018, the first portion of the first information and the second portion of the first information may be combined to form the first information for a first receiving component. Operation 1018 may be performed by a communication subsystem that is the same as or similar to information receiving subsystem 404, in accordance with one or more implementations.

At an operation 1020, the first portion of the second information and the second portion of the second information may be combined to form the second information for a second receiving component. Operation 1020 may be performed by a communication subsystem that is the same as or similar to information receiving subsystem 404, in accordance with one or more implementations.

Figure 11:
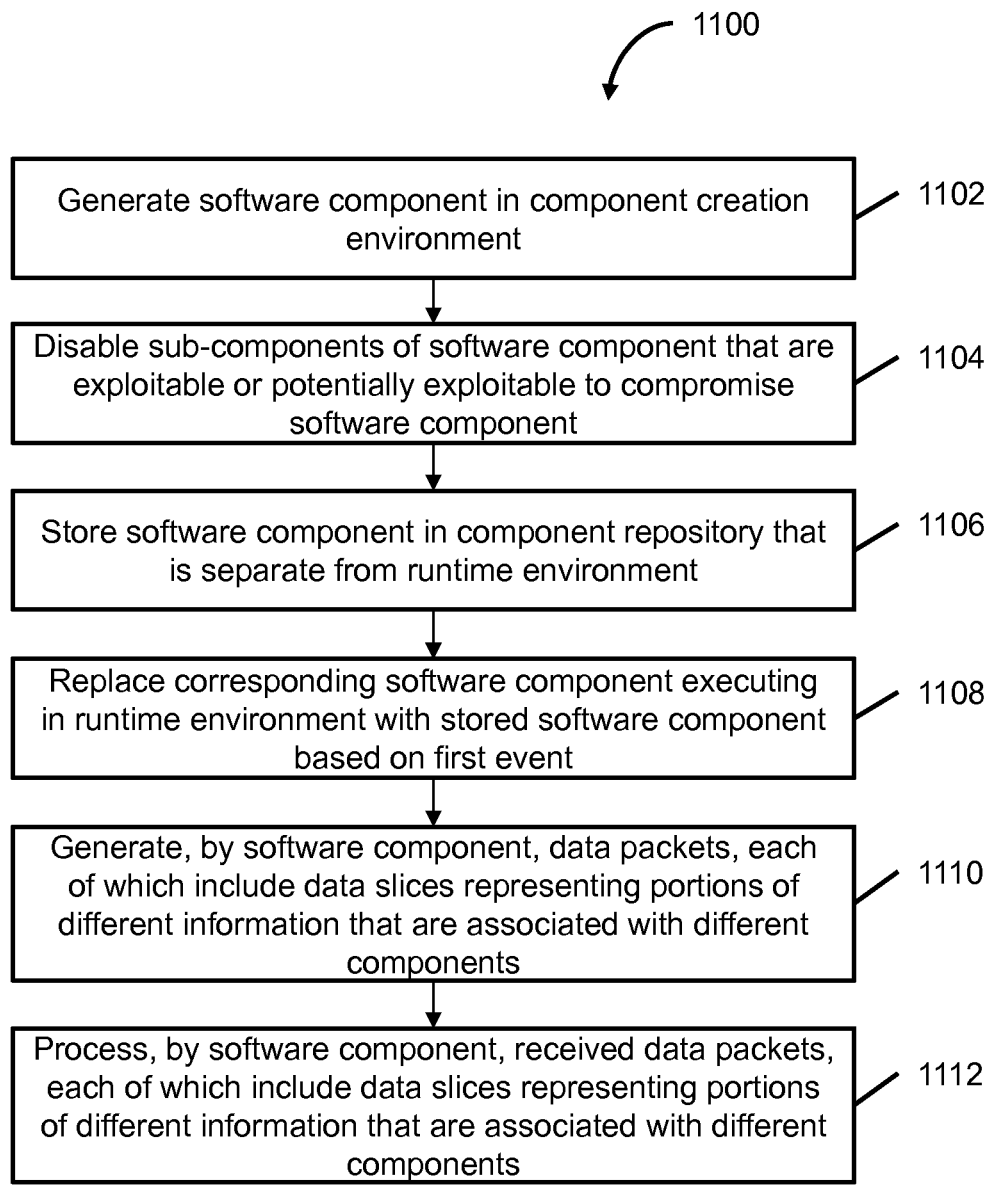
FIG. 11 is an exemplary illustration of a flowchart of a method for facilitating security and integrity of components and information by limiting sub-components of components, replacing components with corresponding known-good software components, and securing and obscuring information transmitted to or from the components over a network, according to an aspect of the invention.

FIG. 11 is an exemplary illustration of a flowchart of a method for facilitating security and integrity of components and information by limiting sub-components of components, replacing components with corresponding known-good software components, and securing and obscuring information transmitted to or from the components over a network, according to an aspect of the invention.

The operations of method 1100 presented below are intended to be illustrative. In some implementations, method 1100 may be accomplished with one or more additional operations not described, and/or without one or more of the operations discussed. Additionally, the order in which the operations of method 1100 are illustrated in FIG. 11 and described below is not intended to be limiting.

In some implementations, method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At an operation 1102, a software component may be generated in a component creation environment. Operation 1102 may be performed by a component authoring subsystem that is the same as or similar to component authoring subsystem 302, in accordance with one or more implementations.

At an operation 1104, sub-components of the software component that are exploitable or potentially exploitable to compromise the software component may be disabled. Operation 1104 may comprise one or more of operations 802, 804, 806, 808, 810, or 812 of method 800 shown by FIG. 8, in accordance with one or more implementations.

At an operation 1106, the software component may be stored in a component repository that is separate from a runtime environment. The runtime environment may, for example, be a production environment in which corresponding software components execute. Operation 1106 may comprise one or more of operations 814 and 816 of method 800 shown by FIG. 8, in accordance with one or more implementations.

At an operation 1108, a corresponding software component executing in the runtime environment may be replaced with the stored software component based on a first event. In some implementations, the first event may include a passage of one or more replacement time intervals, a number of uses of the corresponding software component reaching or exceeding a use threshold, an availability of an updated version of the correspond software component, and/or other event. Operation 1108 may comprise one or more of operations 702, 704, 706, 708, 710, 712, 714, or 716 of method 700 shown by FIG. 7, in accordance with one or more implementations.

At an operation 1110, data packets may be generated by the software component. Each of the generated data packets may include data slices representing portions of different information that are associated with different components. In some implementations, the software component may include an instance of a software component comprising an information transmitting subsystem and/or an information receiving subsystem that are the same as or similar to information transmitting subsystem 402 and/or information receiving subsystem 404. Operation 1110 may comprise one or more of operations 902, 904, 906, 908, 910, 912, 914, 916, or 918 of method 900 shown by FIG. 9, in accordance with one or more implementations.

At an operation 1112, data packets that are received may be processed by the software component. Each of the received data packets may include data slices representing portions of different information that are associated with different components. In some implementations, the software component may include an instance of a software component comprising an information transmitting subsystem and/or an information receiving subsystem that are the same as or similar to information transmitting subsystem 402 and/or information receiving subsystem 404. Operation 1112 may comprise one or more of operations 1002, 1004, 1006, 1008, 1010, 1012, 1014, 1016, or 1018 of method 1000 shown by FIG. 10, in accordance with one or more implementations.

Figure 12:
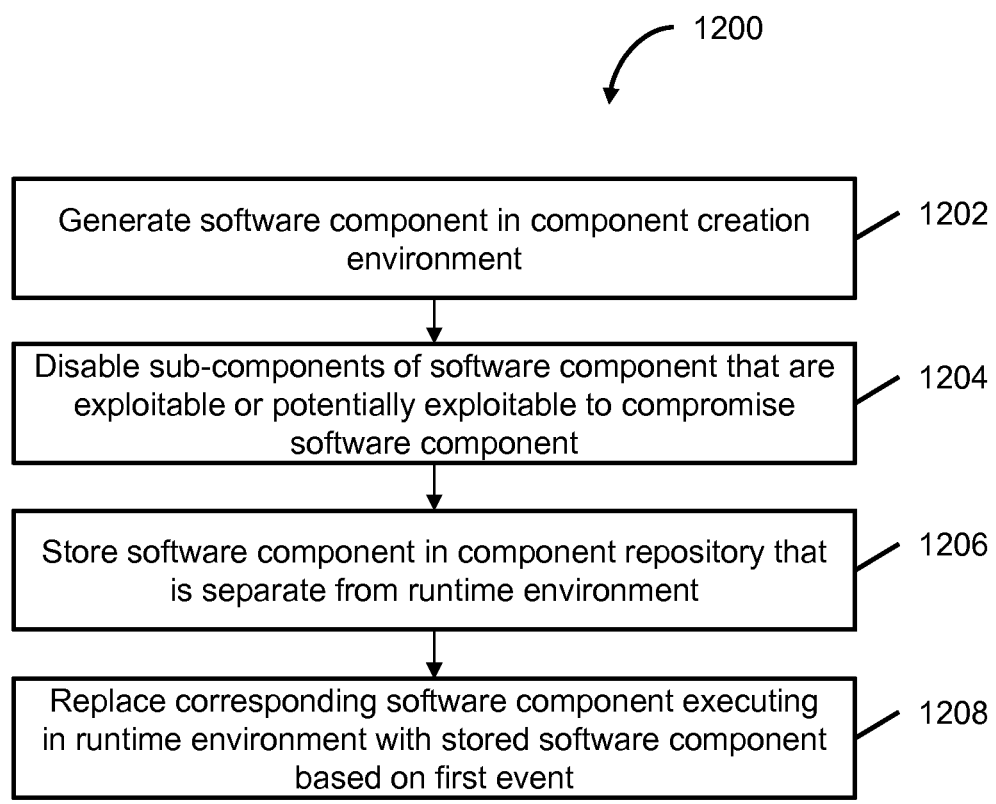
FIG. 12 is an exemplary illustration of a flowchart of a method for facilitating security and integrity of components and information by limiting sub-components of components and replacing components with corresponding known-good software components, according to an aspect of the invention.

FIG. 12 is an exemplary illustration of a flowchart of a method for facilitating security and integrity of components and information by limiting sub-components of components and replacing components with corresponding known-good software components, according to an aspect of the invention.

The operations of method 1200 presented below are intended to be illustrative. In some implementations, method 1200 may be accomplished with one or more additional operations not described, and/or without one or more of the operations discussed. Additionally, the order in which the operations of method 1200 are illustrated in FIG. 12 and described below is not intended to be limiting.

In some implementations, method 1200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

At an operation 1202, a software component may be generated in a component creation environment. Operation 1202 may be performed by a component authoring subsystem that is the same as or similar to component authoring subsystem 302, in accordance with one or more implementations.

At an operation 1204, sub-components of the software component that are exploitable or potentially exploitable to compromise the software component may be disabled. Operation 1204 may comprise one or more of operations 802, 804, 806, 808, 810, or 812 of method 800 shown by FIG. 8, in accordance with one or more implementations.

At an operation 1206, the software component may be stored in a component repository that is separate from a runtime environment. The runtime environment may, for example, be a production environment in which corresponding software components execute. Operation 1206 may comprise one or more of operations 814 and 816 of method 800 shown by FIG. 8, in accordance with one or more implementations.

At an operation 1206, a corresponding software component executing in the runtime environment may be replaced with the stored software component based on a first event. In some implementations, the first event may include a passage of one or more replacement time intervals, a number of uses of the corresponding software component reaching or exceeding a use threshold, an availability of an updated version of the correspond software component, and/or other event. Operation 1208 may comprise one or more of operations 702, 704, 706, 708, 710, 712, 714, or 716 of method 700 shown by FIG. 7, in accordance with one or more implementations.

Figure 13:
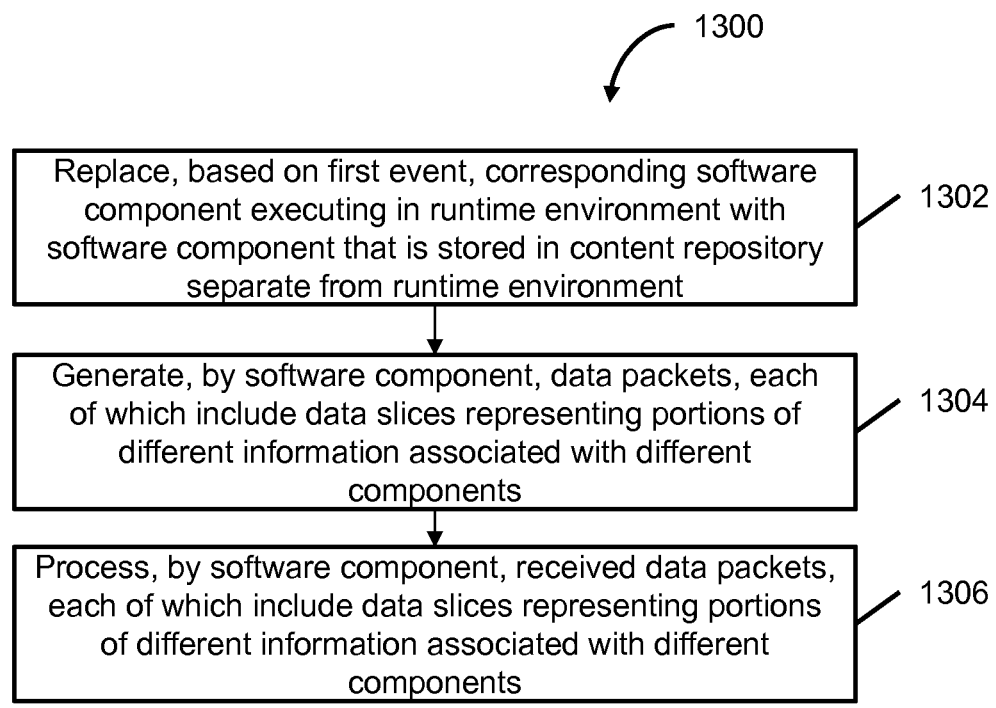
FIG. 13 is an exemplary illustration of a flowchart of a method for facilitating security and integrity of components and information by replacing components with corresponding known-good software components and securing and obscuring information transmitted to or from the components over a network, according to an aspect of the invention.

FIG. 13 is an exemplary illustration of a flowchart of a method for facilitating security and integrity of components and information by replacing components with corresponding known-good software components and securing and obscuring information transmitted to or from the components over a network, according to an aspect of the invention.

The operations of method 1300 presented below are intended to be illustrative. In some implementations, method 1300 may be accomplished with one or more additional operations not described, and/or without one or more of the operations discussed. Additionally, the order in which the operations of method 1300 are illustrated in FIG. 13 and described below is not intended to be limiting.

In some implementations, method 1300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1300 in response to instructions stored electronically on an electronic storage medium. The one or more processing devices may include one or more devices configured through hardware, firmware, and/or software to be specifically designed for execution of one or more of the operations of method 1300.

At an operation 1302, a corresponding software component executing in a runtime environment may be replaced with a software component that is stored in a content repository that is separate from the runtime environment. The replacement of the corresponding software component may be based on a first event. In some implementations, the first event may include a passage of one or more replacement time intervals, a number of uses of the corresponding software component reaching or exceeding a use threshold, an availability of an updated version of the correspond software component, and/or other event. Operation 1302 may comprise one or more of operations 702, 704, 706, 708, 710, 712, 714, or 716 of method 700 shown by FIG. 7, in accordance with one or more implementations.

At an operation 1304, data packets may be generated by the software component. Each of the generated data packets may include data slices representing portions of different information that are associated with different components. In some implementations, the software component may include an instance of a software component comprising an information transmitting subsystem and/or an information receiving subsystem that are the same as or similar to information transmitting subsystem 402 and/or information receiving subsystem 404. Operation 1304 may comprise one or more of operations 902, 904, 906, 908, 910, 912, 914, 916, or 918 of method 900 shown by FIG. 9, in accordance with one or more implementations.

At an operation 1306, data packets that are received may be processed by the software component. Each of the received data packets may include data slices representing portions of different information that are associated with different components. In some implementations, the software component may include an instance of a software component comprising an information transmitting subsystem and/or an information receiving subsystem that are the same as or similar to information transmitting subsystem 402 and/or information receiving subsystem 404. Operation 1306 may comprise one or more of operations 1002, 1004, 1006, 1008, 1010, 1012, 1014, 1016, or 1018 of method 1000 shown by FIG. 10, in accordance with one or more implementations.

Figure 14:
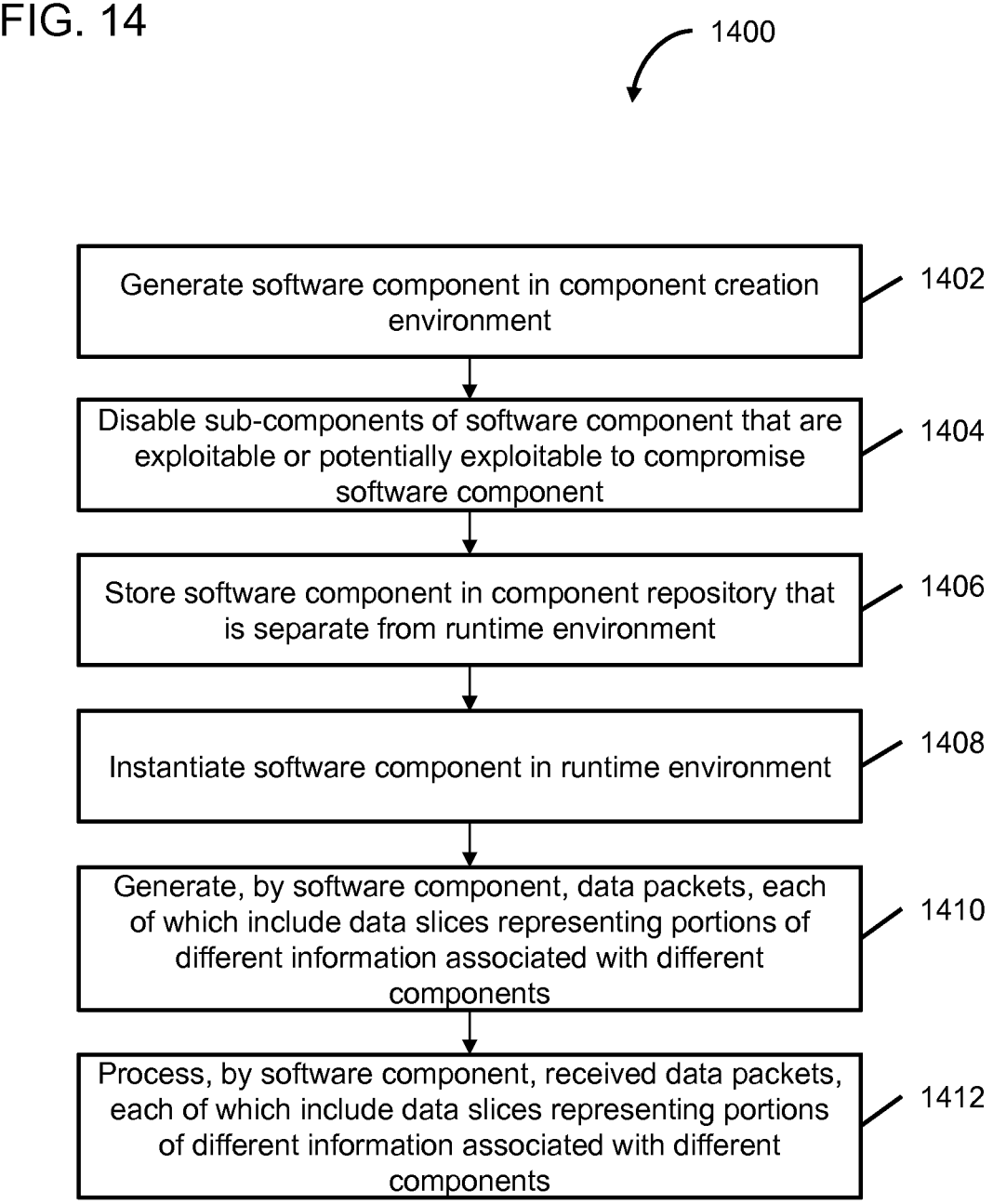
FIG. 14 is an exemplary illustration of a flowchart of a method for facilitating security and integrity of components and information by limiting sub-components of components and securing and obscuring information transmitted to or from the components over a network, according to an aspect of the invention.

FIG. 14 is an exemplary illustration of a flowchart of a method for facilitating security and integrity of components and information by limiting sub-components of components and securing and obscuring information transmitted to or from the components over a network, according to an aspect of the invention.

The operations of method 1400 presented below are intended to be illustrative. In some implementations, method 1400 may be accomplished with one or more additional operations not described, and/or without one or more of the operations discussed. Additionally, the order in which the operations of method 1400 are illustrated in FIG. 14 and described below is not intended to be limiting.

In some implementations, method 1400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1400 in response to instructions stored electronically on an electronic storage medium. The one or more processing devices may include one or more devices configured through hardware, firmware, and/or software to be specifically designed for execution of one or more of the operations of method 1400.

At an operation 1402, a software component may be generated in a component creation environment. Operation 1402 may be performed by a component authoring subsystem that is the same as or similar to component authoring subsystem 302, in accordance with one or more implementations.

At an operation 1404, sub-components of the software component that are exploitable or potentially exploitable to compromise the software component may be disabled. Operation 1404 may comprise one or more of operations 802, 804, 806, 808, 810, or 812 of method 800 shown by FIG. 8, in accordance with one or more implementations.

At an operation 1406, the software component may be stored in a component repository that is separate from a runtime environment. Operation 1406 may comprise one or more of operations 814 and 816 of method 800 shown by FIG. 8, in accordance with one or more implementations.

At an operation 1408, the software component may be instantiated in the runtime environment. For example, the software component may be obtained from the component repository and then instantiated in the runtime environment. Subsequently, the software component may be executed by a runtime execution subsystem in the runtime environment. Operation 1408 may be performed by a component manager subsystem that is the same or similar to component manager subsystem 112, in accordance with one or more implementations.

At an operation 1410, data packets may be generated by the software component. Each of the generated data packets may include data slices representing portions of different information that are associated with different components. In some implementations, the software component may include an instance of a software component comprising an information transmitting subsystem and/or an information receiving subsystem that are the same as or similar to information transmitting subsystem 402 and/or information receiving subsystem 404. Operation 1410 may comprise one or more of operations 902, 904, 906, 908, 910, 912, 914, 916, or 918 of method 900 shown by FIG. 9, in accordance with one or more implementations.

At an operation 1412, data packets that are received may be processed by the software component. Each of the received data packets may include data slices representing portions of different information that are associated with different components. In some implementations, the software component may include an instance of a software component comprising an information transmitting subsystem and/or an information receiving subsystem that are the same as or similar to information transmitting subsystem 402 and/or information receiving subsystem 404. Operation 1412 may comprise one or more of operations 1002, 1004, 1006, 1008, 1010, 1012, 1014, 1016, or 1018 of method 1000 shown by FIG. 10, in accordance with one or more implementations.

In some implementations, the various computers and subsystems illustrated in the Figures may comprise one or more computing devices that are programmed to perform the functions described herein. The computing devices may include one or more electronic storages, one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices. Each of the computers and subsystems may individually provide a given protective measure or may be combined with other computers and subsystems to together provide a combination of protective measures described herein.

The electronic storages may comprise non-transitory storage media that electronically stores information. The electronic storage media of the electronic storages may include one or both of system storage that is provided integrally (i.e., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 112, 116, 118, 302, 304, 306, 402, 404, or other subsystems. The processors may be programmed to execute modules by software; hardware; firmware; some combination of software, hardware, or firmware; and/or other mechanisms for configuring processing capabilities on the processors.

It should be appreciated that the description of the functionality provided by the different subsystems 112, 116, 118, 302, 304, 306, 402, or 404 described herein is for illustrative purposes, and is not intended to be limiting, as any of subsystems 112, 116, 118, 302, 304, 306, 402, or 404 may provide more or less functionality than is described. For example, one or more of subsystems 112, 116, 118, 302, 304, 306, 402, or 404 may be eliminated, and some or all of its functionality may be provided by other ones of subsystems 112, 116, 118, 302, 304, 306, 402, or 404. As another example, additional subsystems may be programmed to perform some or all of the functionality attributed herein to one of subsystems 112, 116, 118, 302, 304, 306, 402, or 404.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

The invention claimed is:

1. A computer-implemented method of limiting exploitable applications in an operating system instance, the method being implemented by a computer system that includes one or more physical processors executing computer program instructions which, when executed, perform the method, the method comprising:

obtaining, by the computer system, at least a first operating system instance, the first operating system instance including a first application that provides a function that is exploitable to compromise the first operating system instance;

disabling, by the computer system, prior to the first operating system instance ever being available for use in a runtime environment in which the first operating system instance is to be executed, the first application such that the function provided by the first application will not be available via the first operating system instance when the first operating system is executed in the runtime environment, wherein disabling the first application comprises associating, prior to the first operating system instance ever being available for use in the runtime environment, the first operating system instance with disabling instructions such that the disabling instructions causes availability of the function provided by the first application to be removed from the first operating system instance during a boot-up of the first operating system instance, and wherein associating the first operating system with the disabling instructions comprises inserting, prior to the first operating system instance ever being available for use in the runtime environment, the disabling instructions into the first operating system instance; and causing, by the computer system, the first operating system instance to be executed in the runtime environment after the first application is disabled such that the function provided by the first application is not available for use and is not exploitable to compromise the first operating system instance.

2. The method of claim 1, wherein disabling the first application comprises removing, prior to the first operating system instance ever being available for use in the runtime environment, the first application from the first operating system instance.

3. The method of claim 1, wherein disabling the first application comprises turning off, prior to the first operating system instance ever being available for use in the runtime environment, the function provided by the first application without removing the first application from the first operating system instance.

4. The method of claim 1, wherein the first operating system instance further includes a second application that is exploitable, the method further comprising:

identifying, by the computer system, a code set associated with the second application that causes the second application to be exploitable; and removing, by the computer system, prior to the first operating system instance ever being available for use in the runtime environment, the code set from the second application such that the second application no longer includes the code set, wherein the first operating system instance includes the second application without the code set when the first operating system instance is executed in the runtime environment.

5. The method of claim 1, further comprising:

generating, by a component authoring subsystem, the first operating system instance in a component creation environment that is separate from the runtime environment;

associating, by the component authoring subsystem, first profile information with the first operating system instance prior to the first operating system instance ever being available for use in the runtime environment, wherein the first profile information is used to determine whether a given application of the first operating system instance should be disabled; and identifying, by a component sealing subsystem, based on the first profile information, the first application as an application to be disabled.

6. The method of claim 1, further comprising:

generating, by a component authoring subsystem, the first operating system instance in a component creation environment such that the first operating system instance includes the first application and a second application; and associating, by the component authoring subsystem, first profile information with the first operating system instance prior to the first operating system instance ever being available for use in the runtime environment, wherein the first profile information is used to determine whether a given application of the first operating system instance should be disabled, and wherein the second application is not disabled based on the first profile information.

7. The method of claim 1, further comprising:

generating, by a component exporting subsystem, integrity information for the first operating system instance after the first application is disabled and prior to the first operating system instance ever being available for use in the runtime environment, wherein the integrity information is used to determine whether the first operating system instance has been modified after the integrity information is generated for the first operating system instance.

8. The method of claim 1, wherein the first operating system instance comprises an operating system instance of a virtual machine.

9. The method of claim 1, wherein the function provided by the first application comprises an administrative or maintenance function provided by the first application, wherein the administrative or maintenance function is used by a user having system administrator privileges to administer or maintain the first operating system instance but is exploitable by others to compromise the first operating system instance, and wherein the administrative or maintenance function provided by the first application is not available to administer or maintain the first operating system instance and is not exploitable to compromise the first operating system instance after the first application is disabled.

10. A system for limiting exploitable applications in an operating system instance, the system comprising:

one or more physical processors programmed with computer program instructions which, when executed, cause the one or more physical processors to:

obtain at least a first operating system, the first operating system instance including a first application that provides a function that is exploitable to compromise the first operating system instance;

disable, prior to the first operating system instance ever being available for use in a runtime environment in which the first operating system instance is to be executed, the first application such that the function provided by the first application will not be available via the first operating system instance when the first operating system is executed in the runtime environment;

associate, prior to the first operating system instance ever being available for use in the runtime environment, the first operating system with disabling instructions such that the disabling instructions causes availability of the function provided by the first application to be removed from the first operating system instance during a boot-up of the first operating system instance, wherein the first application is disabled based on the association of the first operating system instance with the disabling instructions;

insert, prior to the first operating system instance ever being available for use in the runtime environment, the disabling instructions into the first operating system instance, wherein the first operating system instance is associated with the disabling instructions based on the insertion of the disabling instructions; and cause the first operating system to be executed in the runtime environment after the first application is disabled such that the function provided by the first application is not available for use and is not exploitable to compromise the first operating system.

11. The system of claim 10, wherein the one or more physical processors are caused to: remove, prior to the first operating system instance ever being available for use in the runtime environment, the first application from the first operating system instance,
wherein the first application is disabled based on the removal of the first application.

12. The system of claim 10, wherein the one or more physical processors are caused to:
turn off, prior to the first operating system instance ever being available for use in the runtime environment, the function provided by the first application without removing the first application from the first operating system instance,
wherein the first application is disabled based on the turn off of the function provided by the first application.

13. The system of claim 10, wherein the first operating system instance further includes a second application that is exploitable, and wherein the one or more physical processors are caused to:
identify a code set associated with the second application that causes the second application to be exploitable; and
remove, prior to the first operating system instance ever being available for use in the runtime environment, the code set from the second application such that the second application no longer includes the code set, wherein the first operating system instance includes the second application without the code set when the first operating system instance is executed in the runtime environment.

14. The system of claim 10, wherein the one or more physical processors are caused to: generate the first operating system instance in a component creation environment that is separate from the runtime environment;
associate first profile information with the first operating system instance prior to the first operating system instance ever being available for use in the runtime environment, wherein the first profile information is used to determine whether a given application of the first operating system instance should be disabled; and
identify, based on the first profile information, the first application as an application to be disabled.

15. The system of claim 10, wherein the one or more physical processors are caused to:
generate the first operating system instance in a component creation environment such that the first operating system instance includes the first application and a second application; and
associate first profile information with the first operating system instance prior to the first operating system instance ever being available for use in the runtime environment, wherein the first profile information is used to determine whether a given application of the first operating system instance should be disabled, and wherein the second application is not disabled based on the first profile information.

16. The system of claim 10, wherein the one or more physical processors are caused to:
generate integrity information for the first operating system instance after the first application is disabled and prior to the first operating system instance ever being available for use in the runtime environment,
wherein the integrity information is used to determine whether the first operating system instance has been modified after the integrity information is generated for the first operating system instance.

17. The system of claim 10, wherein the first operating system instance comprises an operating system instance of a virtual machine.

18. The system of claim 10, wherein the function provided by the first application comprises an administrative or maintenance function provided by the first application, wherein the administrative or maintenance function is used by a user having system administrator privileges to administer or maintain the first operating system instance but is exploitable by others to compromise the first operating system instance, and wherein the administrative or maintenance function provided by the first application is not available to administer or maintain the first operating system instance and is not exploitable to compromise the first operating system instance after the first application is disabled.

* * * * *